US012068617B2

United States Patent
Pei et al.

(10) Patent No.: US 12,068,617 B2
(45) Date of Patent: Aug. 20, 2024

(54) ELECTRONIC DEVICE, WIRELESS CHARGING RECEIVE APPARATUS, CONTROL METHOD, AND WIRELESS CHARGING SYSTEM

(71) Applicant: Huawei Technologies Co., Ltd., Shenzhen (CN)

(72) Inventors: Changsheng Pei, Dongguan (CN); Liangjin Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 17/758,185

(22) PCT Filed: Nov. 26, 2020

(86) PCT No.: PCT/CN2020/131893
§ 371 (c)(1),
(2) Date: Jun. 29, 2022

(87) PCT Pub. No.: WO2021/135751
PCT Pub. Date: Jul. 8, 2021

(65) Prior Publication Data
US 2023/0065766 A1 Mar. 2, 2023

(30) Foreign Application Priority Data

Dec. 31, 2019 (CN) .......................... 201911415705.9
Jan. 17, 2020 (CN) .......................... 202010054510.2

(51) Int. Cl.
*H02J 50/12* (2016.01)
*H02J 7/00* (2006.01)
(Continued)

(52) U.S. Cl.
CPC .......... *H02J 50/12* (2016.02); *H02J 7/00712* (2020.01); *H02J 50/402* (2020.01); *H02J 50/80* (2016.02)

(58) Field of Classification Search
CPC .......... H02J 50/12; H02J 50/80; H02J 50/402; H02J 7/00712
See application file for complete search history.

(56) References Cited

U.S. PATENT DOCUMENTS

2016/0172895 A1    6/2016    Lee et al.
2016/0176300 A1    6/2016    Bucher et al.
(Continued)

FOREIGN PATENT DOCUMENTS

CN    104124764 A    * 10/2014    .............. H02J 17/00
CN    104124764 A    10/2014
(Continued)

*Primary Examiner* — Jared Fureman
*Assistant Examiner* — Duc M Pham
(74) *Attorney, Agent, or Firm* — Slater Matsil, LLP

(57) ABSTRACT

In the wireless charging receive apparatus of the electronic device, a first communication circuit receives charging data, where the charging data is used to indicate a charging type. A first controller identifies, based on the charging data, that the charging type is a first charging type, and outputs a first rectifier control signal to control a first rectifier circuit to operate in a half-bridge mode. Alternatively, a first controller identifies, based on the charging data, that the charging type is a second charging type, and outputs a second rectifier control signal to control a first rectifier circuit to operate in a full-bridge mode. A first receive coil receives an alternating magnetic field and outputs a first induced voltage.

20 Claims, 20 Drawing Sheets

(51) Int. Cl.
*H02J 50/40* (2016.01)
*H02J 50/80* (2016.01)

(56) References Cited

U.S. PATENT DOCUMENTS

2019/0372387 A1\* 12/2019 Wan ..................... H02J 7/0068
2021/0091599 A1\* 3/2021 Liu ........................ H02J 50/10

FOREIGN PATENT DOCUMENTS

| CN | 206117963 U | 4/2017 |
| CN | 106849267 A | 6/2017 |
| CN | 107147199 A | 9/2017 |
| CN | 107769306 A | 3/2018 |
| CN | 108448693 A | 8/2018 |
| CN | 109066885 A | 12/2018 |
| CN | 109728652 A | 5/2019 |
| CN | 110546854 A | 12/2019 |
| EP | 3276791 A1 | 1/2018 |
| EP | 3393002 A1 | 10/2018 |
| JP | 2014023323 A | 2/2014 |
| KR | 20140007273 A | 1/2014 |
| WO | 2018184573 A1 | 10/2018 |

\* cited by examiner

ELECTRONIC DEVICE, WIRELESS CHARGING RECEIVE APPARATUS, CONTROL METHOD, AND WIRELESS CHARGING SYSTEM

CROSS-REFERENCE TO RELATED APPLICATIONS

This application is a National Stage of International Application No. PCT/CN2020/131893 filed on Nov. 26, 2020, which claims priority to Chinese Patent Application No. 202010054510.2 filed on Jan. 17, 2020, which claims priority to Chinese Patent Application No. 201911415705.9 filed on Dec. 31, 2019. All of the aforementioned applications are hereby incorporated by reference in their entireties.

TECHNICAL FIELD

This application relates to the field of wireless charging technologies, and in particular, to an electronic device, a wireless charging receive apparatus, a control method, and a wireless charging system.

BACKGROUND

In a wireless charging technology (wireless charging technology, WCT), conductive media such as electric fields, magnetic fields, microwaves, or lasers are used to implement wireless transmission of electric energy. Because of advantages such as no wire limitation and plug-free, the wireless charging technology is increasingly widely applied to electronic devices. However, currently, when the electronic device such as a mobile phone performs wireless charging, switching between a high-power fast charging mode and a low-power slow charging mode cannot be implemented.

SUMMARY

Embodiments of this application provide an electronic device, a wireless charging receive apparatus, a control method, and a wireless charging system, to switch between a high-power fast charging mode and a low-power slow charging mode.

To achieve the foregoing objective, the following technical solutions are used in this application:

According to a first aspect of embodiments of this application, an electronic device is provided. The electronic device includes a wireless charging receive apparatus, a battery, and a circuit board. The wireless charging receive apparatus includes a first communication circuit, a first controller, a first rectifier circuit, and a first receive coil. The first communication circuit, the first controller, and the first rectifier circuit are disposed on the circuit board. The first communication circuit is coupled to the first controller. The first communication circuit is configured to receive charging data, where the charging data is used to indicate a charging type. The first controller is coupled to the first rectifier circuit. The first controller is configured to: identify, based on the charging data, that the charging type is a first charging type, and output a first rectifier control signal to control the first rectifier circuit to operate in a half-bridge mode. In this case, the electronic device may perform low-power charging. Alternatively, the first controller is configured to: identify, based on the charging data, that the charging type is a second charging type, and output a second rectifier control signal to control the first rectifier circuit to operate in a full-bridge mode. In this case, the electronic device may perform high-power charging. The first receive coil is coupled to the first rectifier circuit, and is configured to receive an alternating magnetic field and output a first induced voltage. The first rectifier circuit is further coupled to the battery, and the first rectifier circuit is configured to convert the first induced voltage into a direct current power supply voltage in the full-bridge mode or the half-bridge mode. The power supply voltage is used to supply power to the battery. In this way, the electronic device provided in embodiments of this application may be compatible with two charging modes for charging.

Optionally, the wireless charging receive apparatus further includes a second receive coil and a startup circuit disposed on the circuit board. The second receive coil is configured to receive the alternating magnetic field and output a second induced voltage. An inductance of the first receive coil is less than an inductance of the second receive coil. The startup circuit is coupled to the second receive coil. The startup circuit is configured to: convert the second induced voltage into a direct current first voltage, and transmit the first voltage to the first controller. The first voltage is greater than or equal to a minimum operating voltage of the first controller. The first controller is further configured to output the first rectifier control signal to the first rectifier circuit after receiving the first voltage. It can be learned from the foregoing description that a transmit coil in a wireless charging transmit apparatus can transmit the alternating magnetic field. In the electronic device, the first receive coil receives the alternating magnetic field and outputs the first induced voltage, and the second receive coil receives the alternating magnetic field and outputs the second induced voltage. In this case, the transmit coil and the first receive coil may form a voltage converter. The transmit coil and the second receive coil may form another voltage converter. Based on this, because the inductance of the first receive coil is less than the inductance of the second receive coil, the inductance of the first receive coil may be less than an inductance of the transmit coil. In this way, the voltage converter including the transmit coil and the first receive coil can have a buck function. In this case, when the electronic device performs high-power charging, an input voltage of the transmit coil increases. However, the voltage converter including the transmit coil and the first receive coil may be used to buck the voltage, so that a quantity of cascaded voltage conversion circuits at an output end of the first rectifier circuit can be reduced, thereby reducing a problem of a relatively large power transmission efficiency loss caused by an excessively large quantity of cascaded voltage conversion circuits in a high-power charging process. In addition, when the voltage converter including the transmit coil and the first receive coil has the buck function, a voltage output by the first rectifier circuit is very low, and cannot drive the first controller. In this case, because the inductance of the second receive coil is greater than the inductance of the first receive coil, the startup circuit coupled to the second receive coil may convert the second induced voltage output by the second receive coil into the first voltage. Because the first voltage is greater than or equal to the minimum operating voltage of the first controller, the first voltage can drive the first controller, so that the first controller can output the first rectifier control signal and the second rectifier control signal to the first rectifier circuit, thereby controlling the first rectifier circuit to provide the power supply voltage to the voltage conversion circuit. Therefore, when the electronic device provided in embodiments of this application performs high-power charging, the first receive coil with a relatively small inductance may be used to buck the input voltage, to reduce power consumption during high-power charging. In addition, the second receive coil may be further used to properly drive the first controller.

Optionally, the wireless charging receive apparatus further includes a first voltage regulator circuit disposed on the circuit board. The first voltage regulator circuit is coupled to the battery and the first controller. When the power supply voltage is less than a preset regulation voltage of the first voltage regulator circuit, the first voltage regulator circuit is configured to transmit a voltage of the battery to the first controller, to supply power to the first controller. When the power supply voltage is greater than the preset regulation voltage of the first voltage regulator circuit, the first voltage regulator circuit is further configured to disconnect the battery from the first controller. In addition, the first controller is coupled to an output end of the first rectifier circuit. Therefore, the power supply voltage output by the first rectifier circuit is further used to supply power to the first controller. In this way, when a voltage converter including a transmit coil and the first receive coil has a buck function, a voltage output by the first rectifier circuit is very low, and cannot drive the first controller. The first voltage regulator circuit may provide remaining power in the battery for the first controller, to supply power to the first controller, so that the first controller outputs the first rectifier control signal and the second rectifier control signal to the first rectifier circuit.

Optionally, the wireless charging receive apparatus further includes a voltage conversion circuit disposed on the circuit board. The voltage conversion circuit is coupled to the first rectifier circuit and the battery. The voltage conversion circuit is configured to: convert the power supply voltage, and supply power to the battery by using a converted voltage.

Optionally, a winding manner of the first receive coil and the second receive coil may be that the first receive coil is disposed inside the second receive coil. A first end and a second end of the first receive coil are located between a first end and a second end of the second receive coil.

Optionally, a winding manner of the first receive coil and the second receive coil may alternatively be that the second receive coil is disposed inside the first receive coil. A first end and a second end of the first receive coil are located between a first end and a second end of the second receive coil.

Optionally, a winding manner of the first receive coil and the second receive coil may alternatively be that one part of the second receive coil is disposed inside the first receive coil, and the other part is disposed outside the first receive coil. A first end and a second end of the first receive coil are located between a first end and a second end of the second receive coil.

Optionally, when the electronic device is placed on a cradle and just starts to be charged, because the wireless charging receive apparatus just starts to perform a charging process, a voltage input by the transmit coil is a fixed value. Therefore, when there is a relatively large deviation in an alignment position of the second receive coil and the transmit coil in the cradle, an induced voltage output by the second receive coil is lower. Therefore, when a position deviation between the second receive coil and the transmit coil reaches a preset maximum value, for example, 10 mm, it can still be ensured that the induced voltage output by the second receive coil is converted, by using the startup circuit, to supply power to the first controller, so that the first controller outputs the first rectifier control signal and the second rectifier control signal to the first rectifier circuit. The inductance of the second receive coil is four times the inductance of the first receive coil.

Optionally, the startup circuit may include a second rectifier circuit. The second rectifier circuit includes a first diode and a second diode that are connected in series, and a third diode and a fourth diode that are connected in series. Cathodes of the first diode and the third diode are coupled to the first controller. Anodes of the second diode and the fourth diode are coupled to a ground terminal. The wireless charging receive apparatus further includes a first resonant capacitor. A first end of the first resonant capacitor is coupled to a first end of the second receive coil, and a second end of the first resonant capacitor is coupled to an anode of the first diode and a cathode of the second diode. A second end of the second receive coil is coupled to an anode of the third diode and a cathode of the fourth diode. The second rectifier circuit is a full-bridge rectifier circuit and operates only in the full-bridge mode.

Optionally, the startup circuit includes a second rectifier circuit. The second rectifier circuit includes a first diode and a second diode that are connected in series. A cathode of the first diode is coupled to the first controller. The wireless charging receive apparatus further includes a first resonant capacitor. A first end of the first resonant capacitor is coupled to a first end of the second receive coil, and a second end of the first resonant capacitor is coupled to an anode of the first diode and a cathode of the second diode. Both a second end of the second receive coil and an anode of the second diode are coupled to a ground terminal. The second rectifier circuit is a half-bridge rectifier circuit and operates only in the half-bridge mode.

Optionally, the startup circuit includes a second rectifier circuit. The second rectifier circuit includes a first diode and a second diode that are connected in series. The wireless charging receive apparatus further includes a first resonant capacitor and a second resonant capacitor that are connected in series. A cathode of the first diode and a first end of the first resonant capacitor are coupled to the first controller. Both an anode of the second diode and a second end of the second resonant capacitor are coupled to a ground terminal. A first end of the second receive coil is coupled to an anode of the first diode and a cathode of the second diode. A second end of the second receive coil is coupled between a second end of the first resonant capacitor and a first end of the second resonant capacitor. The second rectifier circuit is a half-bridge rectifier circuit and operates only in the half-bridge mode.

Optionally, the startup circuit further includes a second voltage regulator circuit. The second voltage regulator circuit is coupled to the second rectifier circuit and the first controller. When the power supply voltage is less than a preset regulation voltage of the second voltage regulator circuit, the second voltage regulator circuit is configured to convert a voltage output by the second rectifier circuit into the first voltage. When the power supply voltage is greater than the preset regulation voltage of the second voltage regulator circuit, the second voltage regulator circuit is further configured to disconnect the second rectifier circuit from the first controller. In addition, the first controller is coupled to an output end of the first rectifier circuit, and the power supply voltage output by the first rectifier circuit may supply power to the first controller. In this way, when a voltage converter including a transmit coil and the first receive coil has a buck function, a voltage output by the first rectifier circuit is very low, and cannot drive the first controller. The second voltage regulator circuit may convert the voltage output by the second rectifier circuit into the first voltage, to supply power to the first controller, so that the first controller outputs the first rectifier control signal and the second rectifier control signal to the first rectifier circuit. In addition, when the power supply voltage output by the first rectifier circuit is greater than the preset regulation voltage of the second voltage regulator circuit, the second voltage regulator circuit disconnects the second rectifier circuit from the first controller. Therefore, the power supply voltage output by the first rectifier circuit may supply power to the first controller. In this case, the startup circuit needs to operate only when the voltage output by the first rectifier circuit is very low and cannot drive the first controller. After the first rectifier circuit outputs the power supply voltage, the startup circuit may stop operating.

Optionally, the startup circuit further includes a second voltage regulator circuit. The second voltage regulator circuit is coupled to the second rectifier circuit and the first controller, and the second voltage regulator circuit is configured to convert a voltage output by the second rectifier circuit into the first voltage. In this way, in an operating process of the wireless charging receive apparatus, the startup circuit always provides the first voltage for the first controller.

According to a second aspect of embodiments of this application, a wireless charging system is provided, including a wireless charging transmit apparatus and any electronic device described above. The wireless charging transmit apparatus includes a transmit coil. The transmit coil is configured to transmit an alternating magnetic field. A first receive coil in the electronic device is configured to receive the alternating magnetic field and output a first induced voltage. An inductance of the transmit coil is greater than an inductance of the first receive coil. The wireless charging system has a same technical effect as the electronic device provided in the foregoing embodiments. Details are not described herein again.

Optionally, a first communication circuit in the electronic device is configured to receive charging data. The charging data is used to indicate a charging type. When a first controller in the electronic device identifies, based on the charging data, that the charging type is a second charging type, the first communication circuit is further configured to send a first voltage adjustment instruction. The first voltage adjustment instruction is used to instruct to increase an input voltage of the first receive coil. The wireless charging transmit system further includes an adapter coupled to the transmit coil. The wireless charging transmit apparatus further includes a second communication circuit and a second controller. The second communication circuit is coupled to the first communication circuit. The second communication circuit is configured to send the charging data and receive the first voltage adjustment instruction. The second controller is coupled to the adapter and the second communication circuit, the second controller is configured to generate a first voltage adjustment control signal according to the first voltage adjustment instruction, and the first voltage adjustment control signal is used to increase an output voltage of the adapter. In this way, high-power charging of the electronic device can be implemented by increasing the output voltage of the adapter.

Optionally, a first communication circuit in the electronic device is configured to receive charging data. The charging data is used to indicate a charging type. When a first controller in the electronic device identifies, based on the charging data, that the charging type is a second charging type, the first communication circuit is further configured to send a first voltage adjustment instruction. The first voltage adjustment instruction is used to instruct to increase an input voltage of the first receive coil. The wireless charging transmit system further includes an adapter coupled to the transmit coil. The wireless charging transmit apparatus further includes a voltage adjustment circuit, a second communication circuit, and a second controller. The voltage adjustment circuit is coupled to the transmit coil and the adapter. The voltage adjustment circuit is configured to adjust a voltage output by the adapter to the transmit coil. The second communication circuit is coupled to the first communication circuit, and the second communication circuit is configured to send the charging data and receive the first voltage adjustment instruction. The second controller is coupled to the voltage adjustment circuit and the second communication circuit, and the second controller generates a first voltage adjustment control signal according to the first voltage adjustment instruction. The first voltage adjustment control signal is used to increase an output voltage of the voltage adjustment circuit. In this way, high-power charging of the electronic device can be implemented by increasing the output voltage of the voltage adjustment circuit.

According to a third aspect of embodiments of this application, a wireless charging receive apparatus is provided. The wireless charging receive apparatus includes a first communication circuit, a first controller, a first rectifier circuit, and a first receive coil. The first communication circuit is coupled to the first controller. The first communication circuit is configured to receive charging data, where the charging data is used to indicate a charging type. The first controller is coupled to the first rectifier circuit. The first controller is configured to: identify, based on the charging data, that the charging type is a first charging type, and output a first rectifier control signal to control the first rectifier circuit to operate in a half-bridge mode. Alternatively, the first controller is configured to: identify, based on the charging data, that the charging type is a second charging type, and output a second rectifier control signal to control the first rectifier circuit to operate in a full-bridge mode. The first receive coil is coupled to the first rectifier circuit, and is configured to receive an alternating magnetic field and output a first induced voltage. The first rectifier circuit is configured to convert the first induced voltage into a direct current power supply voltage. The power supply voltage is used to supply power to a battery. The wireless charging receive apparatus has a same technical effect as the electronic device provided in the foregoing embodiments. Details are not described herein again.

Optionally, the wireless charging receive apparatus further includes a second receive coil and a startup circuit. The second receive coil is configured to receive the alternating magnetic field and output a second induced voltage. An inductance of the first receive coil is less than an inductance of the second receive coil. The startup circuit is coupled to the second receive coil. The startup circuit is configured to: convert the second induced voltage into a direct current first voltage, and transmit the first voltage to the first controller. The first voltage is greater than or equal to a minimum operating voltage of the first controller. The first controller is further configured to output the first rectifier control signal to the first rectifier circuit after receiving the first voltage. Technical effects of the second receive coil and the startup circuit are the same as those described above. Details are not described herein again.

Optionally, the wireless charging receive apparatus further includes a first voltage regulator circuit. The first voltage regulator circuit is coupled to the battery and the first controller. When the power supply voltage is less than a preset regulation voltage of the first voltage regulator circuit, the first voltage regulator circuit is configured to transmit a voltage of the battery to the first controller, to supply power to the first controller. When the power supply voltage is greater than the preset regulation voltage of the first voltage regulator circuit, the first voltage regulator circuit is further configured to disconnect the battery from the first controller. In addition, the first controller is coupled to an output end of the first rectifier circuit. Therefore, the power supply voltage output by the first rectifier circuit is further used to supply power to the first controller. A technical effect of the first voltage regulator circuit is the same as that described above. Details are not described herein again.

Optionally, the wireless charging receive apparatus further includes a voltage conversion circuit. The voltage conversion circuit is coupled to the first rectifier circuit and the battery. The voltage conversion circuit is configured to: convert the power supply voltage, and supply power to the battery by using a converted voltage.

Optionally, a winding manner of the first receive coil and the second receive coil may be that the first receive coil is disposed inside the second receive coil. A first end and a second end of the first receive coil are located between a first end and a second end of the second receive coil.

Optionally, a winding manner of the first receive coil and the second receive coil may alternatively be that the second receive coil is disposed inside the first receive coil. A first end and a second end of the first receive coil are located between a first end and a second end of the second receive coil.

Optionally, a winding manner of the first receive coil and the second receive coil may alternatively be that one part of the second receive coil is disposed inside the first receive coil, and the other part is disposed outside the first receive coil. A first end and a second end of the first receive coil are located between a first end and a second end of the second receive coil.

Optionally, the inductance of the second receive coil is four times the inductance of the first receive coil. Technical effects of setting the inductance of the second receive coil and the inductance of the first receive coil are the same as those described above. Details are not described herein again.

Optionally, the startup circuit includes a second rectifier circuit. The second rectifier circuit includes a first diode and a second diode that are connected in series, and a third diode and a fourth diode that are connected in series. Cathodes of the first diode and the third diode are coupled to the first controller. Anodes of the second diode and the fourth diode are coupled to a ground terminal. The wireless charging receive apparatus further includes a first resonant capacitor. A first end of the first resonant capacitor is coupled to a first end of the second receive coil, and a second end of the first resonant capacitor is coupled to an anode of the first diode and a cathode of the second diode. A second end of the second receive coil is coupled to an anode of the third diode and a cathode of the fourth diode. The second rectifier circuit is a full-bridge rectifier circuit and operates only in the full-bridge mode.

Optionally, the startup circuit includes a second rectifier circuit. The second rectifier circuit includes a first diode and a second diode that are connected in series. A cathode of the first diode is coupled to the first controller. The wireless charging receive apparatus further includes a first resonant capacitor. A first end of the first resonant capacitor is coupled to a first end of the second receive coil, and a second end of the first resonant capacitor is coupled to an anode of the first diode and a cathode of the second diode. Both a second end of the second receive coil and an anode of the second diode are coupled to a ground terminal. The second rectifier circuit is a half-bridge rectifier circuit and operates only in the half-bridge mode.

Optionally, the startup circuit includes a second rectifier circuit. The second rectifier circuit includes a first diode and a second diode that are connected in series. The wireless charging receive apparatus further includes a first resonant capacitor and a second resonant capacitor that are connected in series. A cathode of the first diode and a first end of the first resonant capacitor are coupled to the first controller. Both an anode of the second diode and a second end of the second resonant capacitor are coupled to a ground terminal. A first end of the second receive coil is coupled to an anode of the first diode and a cathode of the second diode. A second end of the second receive coil is coupled between a second end of the first resonant capacitor and a first end of the second resonant capacitor. The second rectifier circuit is a half-bridge rectifier circuit and operates only in the half-bridge mode.

Optionally, the startup circuit further includes a voltage regulator circuit. The second voltage regulator circuit is coupled to the second rectifier circuit and the first controller. When the power supply voltage is less than a preset regulation voltage of the second voltage regulator circuit, the second voltage regulator circuit is configured to convert a voltage output by the second rectifier circuit into the first voltage. When the power supply voltage is greater than the preset regulation voltage of the second voltage regulator circuit, the second voltage regulator circuit is further configured to disconnect the second rectifier circuit from the first controller. In addition, the first controller is coupled to an output end of the first rectifier circuit, and the power supply voltage output by the first rectifier circuit may supply power to the first controller. A technical effect of the second voltage regulator circuit is the same as that described above. Details are not described herein again.

Optionally, the startup circuit further includes a second voltage regulator circuit. The second voltage regulator circuit is coupled to the second rectifier circuit and the first controller, and the second voltage regulator circuit is configured to convert a voltage output by the second rectifier circuit into the first voltage. In this way, in an operating process of the wireless charging receive apparatus, the startup circuit always provides the first voltage for the first controller.

According to a fourth aspect of embodiments of this application, a control method for a wireless charging receive apparatus is provided. The wireless charging receive apparatus includes a first communication circuit, a first controller, a first rectifier circuit, and a first receive coil. The first communication circuit is coupled to the first controller. The first rectifier circuit is coupled to the first receive coil, the first controller, and a battery. The foregoing control method includes: First, the first communication circuit receives a start signal, so that the wireless charging receive apparatus is started. Then, the first receive coil receives an alternating magnetic field and outputs a first induced voltage. Then, the first controller outputs a first rectifier control signal, to control the first rectifier circuit to operate in a half-bridge mode. The first rectifier circuit converts the first induced voltage into a power supply voltage. Then, the first communication circuit receives charging data, where the charging data is used to indicate a charging type. The first controller identifies, based on the charging data, that the charging type is a second charging type, and outputs a second rectifier control signal to control the first rectifier circuit to operate in a full-bridge mode. The first rectifier circuit converts the first induced voltage into a direct current power supply voltage. The battery receives the power supply voltage, and performs charging. The control method for the wireless charging receive apparatus has a same technical effect as the electronic device provided in the foregoing embodiments. Details are not described herein again.

Optionally, the method further includes: First, the first controller sends a second voltage adjustment instruction. The second voltage adjustment instruction is used to instruct to decrease an input voltage of the first receive coil. The first controller outputs the first rectifier control signal to the first rectifier circuit, to control the first rectifier circuit to operate in the half-bridge mode. In this way, when the electronic device performs high-power charging, the electronic device may further switch to low-power charging based on a requirement.

Optionally, the wireless charging receive apparatus further includes a second receive coil and a startup circuit. An inductance of the first receive coil is less than an inductance of the second receive coil. Before the first controller outputs the first rectifier control signal, the method further includes: The second receive coil receives the alternating magnetic field and outputs a second induced voltage. Then, the startup circuit converts the second induced voltage into a direct current first voltage, and transmits the first voltage to the first controller. The first voltage is greater than or equal to a minimum operating voltage of the first controller. Technical effects of the second receive coil and the startup circuit are the same as those described above. Details are not described herein again.

Optionally, the wireless charging receive apparatus further includes a first voltage regulator circuit. The first voltage regulator circuit is coupled to the battery and the first controller. Before the first controller outputs the first rectifier control signal, the method further includes: When the power supply voltage is less than a preset regulation voltage of the first voltage regulator circuit, the first voltage regulator circuit transmits a voltage of the battery to the first controller. Alternatively, when the power supply voltage is greater than the preset regulation voltage of the first voltage regulator circuit, the first voltage regulator circuit disconnects the battery from the first controller. The first controller receives the power supply voltage. A technical effect of the first voltage regulator circuit is the same as that described above. Details are not described herein again.

Optionally, the wireless charging receive apparatus further includes a voltage conversion circuit. The voltage conversion circuit is coupled to the first rectifier circuit and the battery. Before the battery receives the power supply voltage, the method further includes: The voltage conversion circuit in the wireless charging receive apparatus converts the power supply voltage, and supplies power to the battery by using a converted voltage. A technical effect of the voltage conversion circuit is the same as that described above. Details are not described herein again.

BRIEF DESCRIPTION OF THE DRAWINGS

FIG. 1b is a schematic diagram of a structure of the electronic device in FIG. 1a;

Figure 1A:
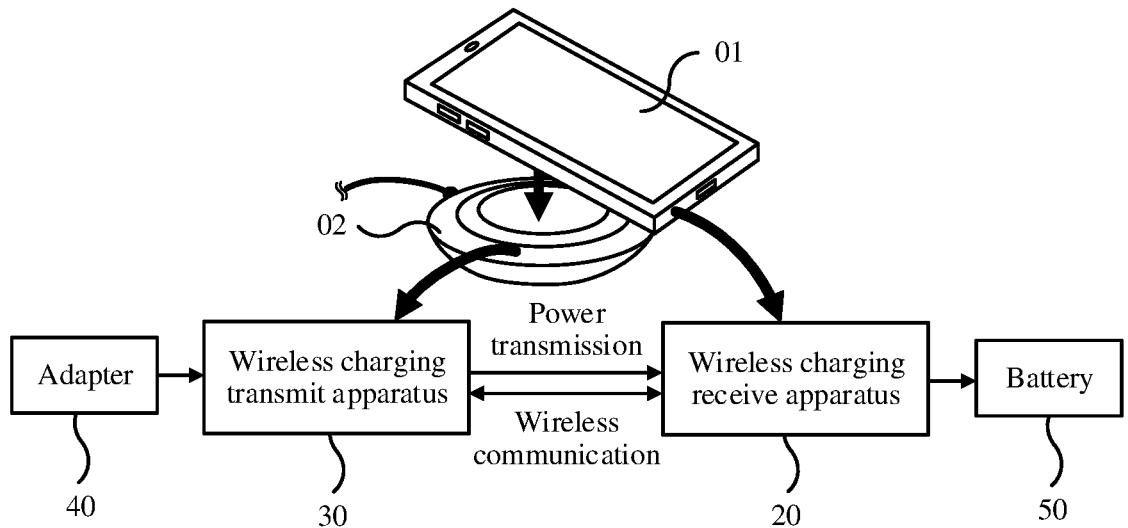
FIG. 1a is a schematic diagram of a structure of an electronic device and a wireless charging system according to an embodiment of this application.

REFERENCE NUMERALS 01-electronic device; 02-charging cradle; 20-wireless charging receive apparatus; 30-wireless charging transmit apparatus; 40-adapter; 50-battery; 10-display panel; 11-middle frame; 110-bearing plate; 111-bezel; 12-housing; 301-second communication circuit; 302-DC/AC; 303-second oscillation circuit; 304-second controller; 305-voltage adjustment circuit; 201-first communication circuit; 202-first oscillation circuit; 203-first rectifier circuit; 204: startup circuit; 205: first controller; 206: voltage conversion circuit; 211: first receive coil; 212: second receive coil; 202: first oscillation circuit; 311: transmit coil; 214: second rectifier circuit; 224: second voltage regulator circuit; 225: first voltage regulator circuit; 61: first switch component; 62: second switch component; 63: third switch component; 64: fourth switch component.

DETAILED DESCRIPTION OF ILLUSTRATIVE EMBODIMENTS

The following describes the technical solutions in embodiments of this application with reference to accompanying drawings in embodiments of this application. It is clearly that the described embodiments are merely a part rather than all of the embodiments of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features. In the descriptions of this application, unless otherwise stated, "a plurality of" means two or more than two.

In addition, in this application, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this application, a term "connection" should be understood in a broad sense unless otherwise expressly specified and limited. For example, the "connection" may be a fixed connection, may be a detachable connection, may be an integral connection, may be a direct connection, or may be an indirect connection implemented by using a medium. In addition, a term "coupling" may be a manner of implementing an electrical connection for signal transmission. The "coupling" may be a direct electrical connection, or may be an indirect electrical connection through an intermediate medium.

An embodiment of this application provides an electronic device. The electronic device includes a wireless device such as a mobile phone (mobile phone), a tablet computer (pad), a computer with a wireless transceiver function, an intelligent wearable product (for example, a smartwatch or a smart band), a virtual reality (virtual reality, VR) terminal device, or an augmented reality (augmented reality AR) terminal device. The electronic device may alternatively be an electronic product such as a wireless charging electric vehicle, a small wireless charging household appliance (such as a soymilk machine or a floor sweeping robot), or a drone. A specific form of the electronic device is not particularly limited in this embodiment of this application. For ease of description, an example in which an electronic device 01 is a mobile phone shown in FIG. 1a is used below for description.

To wirelessly charge the electronic device 01, a wireless charging system provided in this embodiment of this application includes a wireless charging receive (receive, RX) apparatus 20 disposed in the electronic device 01 and a battery 50 coupled to the wireless charging receive apparatus 20 that are shown in FIG. 1a.

The wireless charging system further includes a wireless charging transmit (transmit, TX) apparatus 30 disposed in a charging cradle 02 and an adapter 40 coupled to the wireless charging transmit apparatus 30 that are shown in FIG. 1a. The adapter 40 is configured to provide charging electric energy. The adapter 40 can convert a 220 V alternating current into a direct current (for example, 5 V or 10 V) based on a charging power requirement, and transmit the direct current to the wireless charging transmit apparatus 30.

Figure 1B:
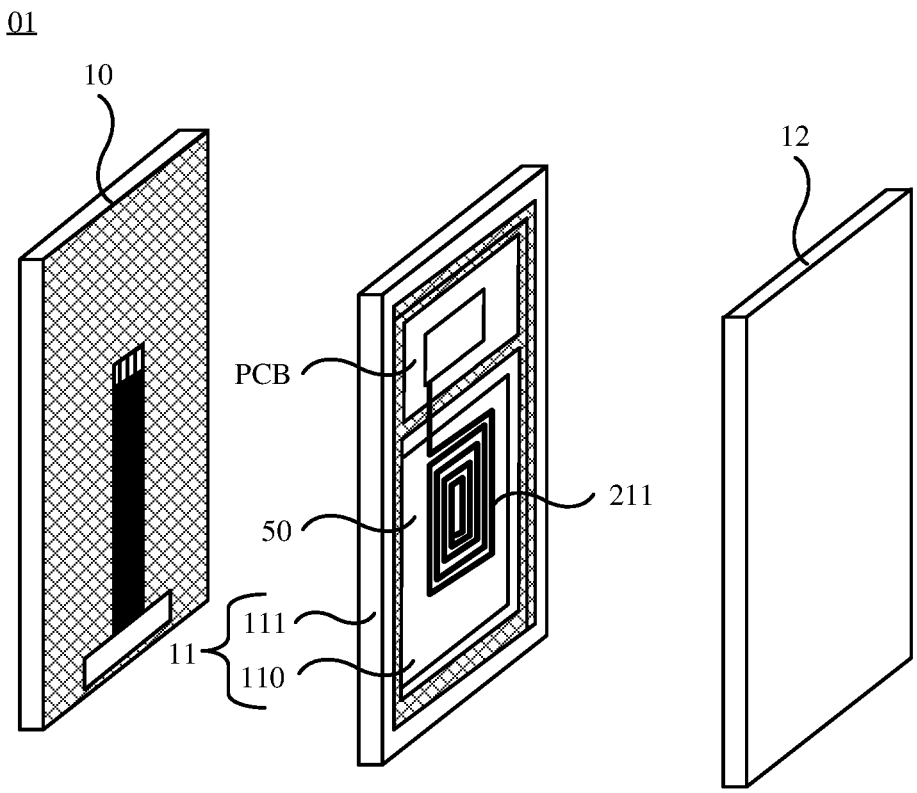

For example, the electronic device 01 is a mobile phone. As shown in FIG. 1b, the electronic device 01 mainly includes a display panel (display panel, DP) 10. The display panel 10 may be a liquid crystal display (liquid crystal display, LCD) or an organic light-emitting diode (organic light-emitting diode, OLED) display panel. This is not limited in this application. The electronic device 01 further includes a middle frame 11 and a housing 12 shown in FIG. 1b. The display panel 10 and the housing 12 are separately located on two sides of the middle frame 11. A back facet of the display panel 10 faces the housing 12, and the display panel 10 is connected to the housing 12 through the middle frame 11. The middle frame 11 includes a bearing plate 110 and a bezel in surrounding the bearing plate 110.

The electronic device 01 may further include a printed circuit board (printed circuit board, PCB). The PCB and the battery 50 are disposed on a surface that is of the bearing plate 110 and that faces the housing 12. In addition, the wireless charging receive apparatus 20 may include a first oscillation circuit 202 shown in FIG. 2a. The first oscillation circuit 202 may include a first receive coil 211 and a third resonant capacitor $C_{RX3}$ that are shown in FIG. 2b. As shown in FIG. 1B, the first receive coil 211 may be disposed on the bearing plate 110, or may be disposed on a surface that is of the battery 50 and that faces the housing 12.

Figure 2A:
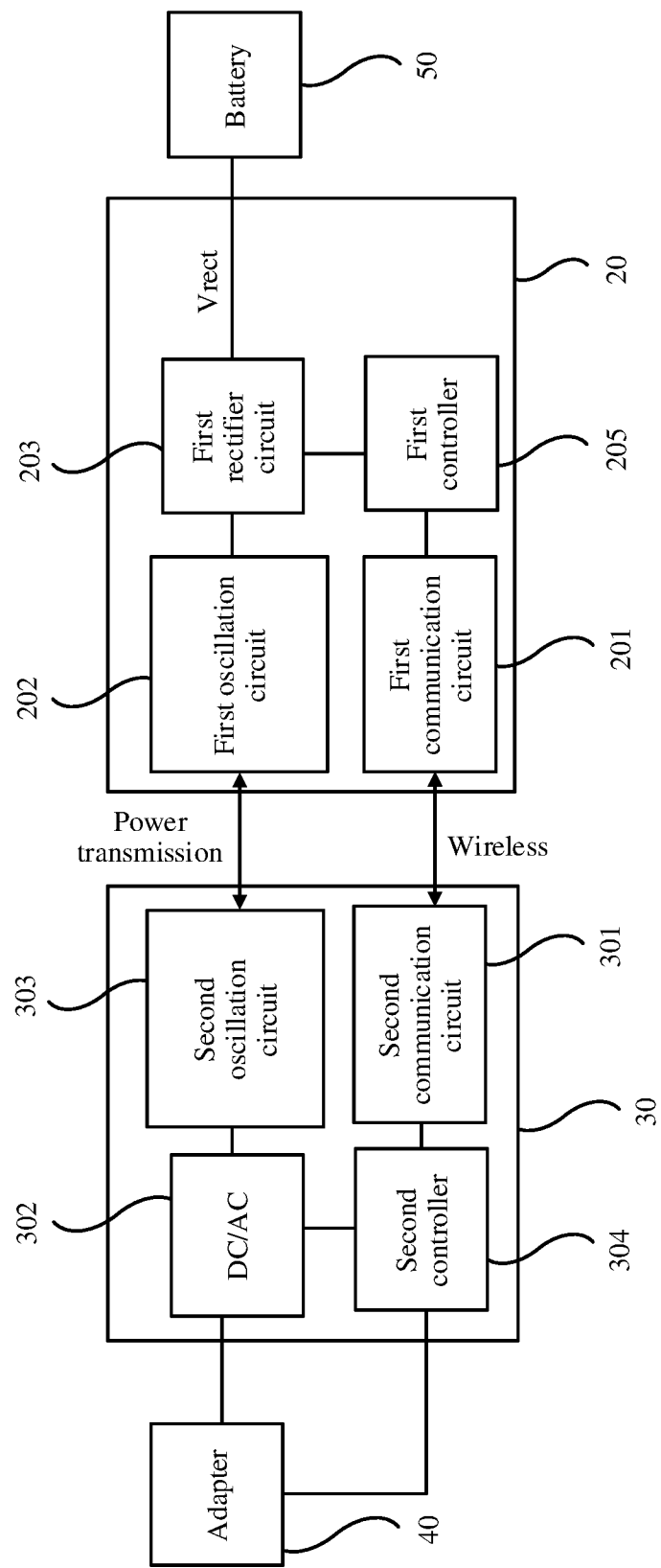
FIG. 2a is a schematic diagram of a structure of a wireless charging system according to an embodiment of this application.
Figure 2B:
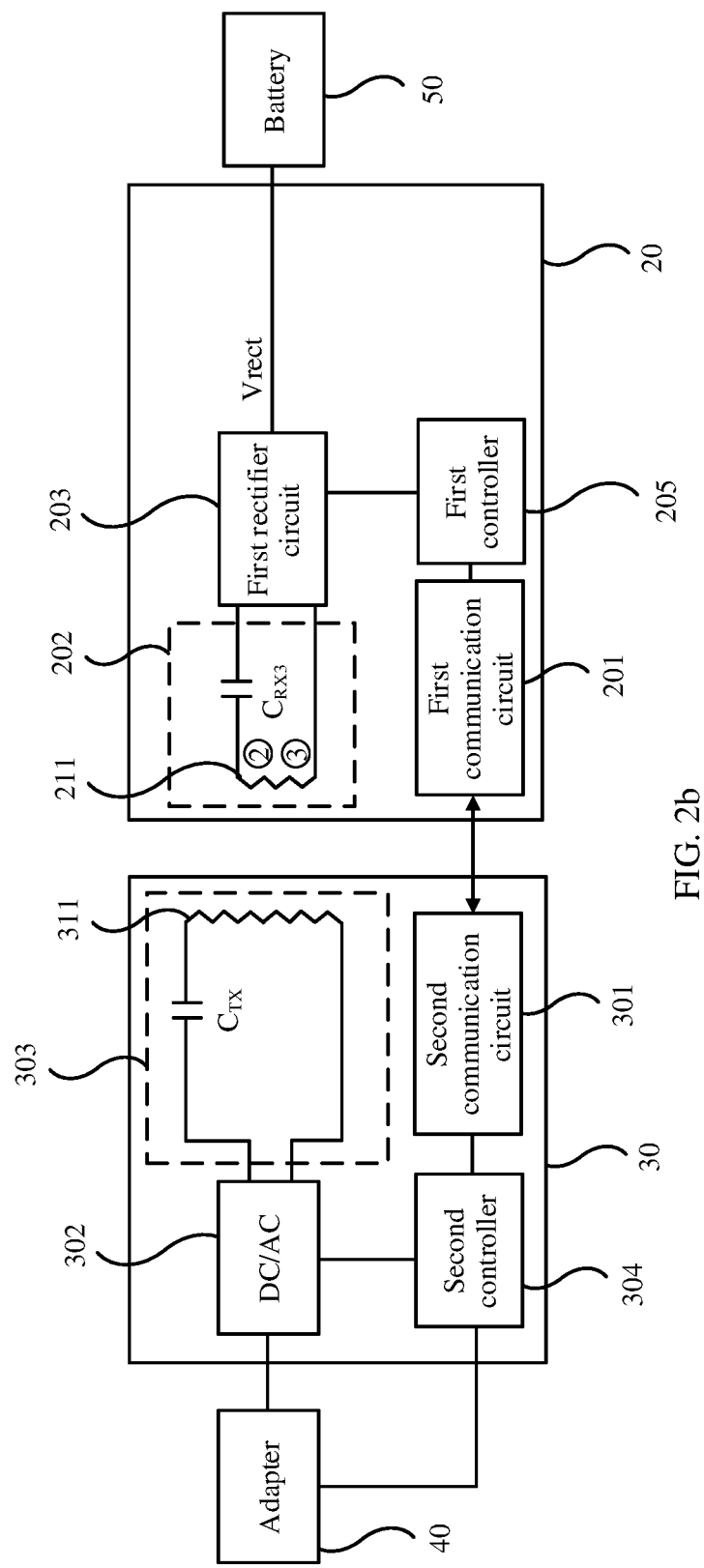
FIG. 2b is a schematic diagram of a structure of another wireless charging system according to an embodiment of this application.

To wirelessly charge the electronic device 01, as shown in FIG. 2a, the wireless charging transmit apparatus 30 includes a direct current (direct current, DC)-to-alternating current (alternating current, AC) converter, namely, a DC/AC 302, and a second oscillation circuit 303. The DC/AC 302 is coupled to the adapter 40, and can convert a direct current output by the adapter 40 into an alternating current. The second oscillation circuit 303 is coupled to the DC/AC 302.

The second oscillation circuit 303 may include a fourth resonant capacitor $C_{TX}$ and a transmit coil 311 that are shown in FIG. 2b. After the DC/AC 302 converts a direct current output by the adapter 40 into an alternating current, and transmits the alternating current to the second oscillation circuit 303, the transmit coil 311 in the second oscillation circuit 303 can generate a high-frequency alternating current and transmit an alternating magnetic field. The first receive coil 211 in the first oscillation circuit 202 receives the alternating magnetic field and outputs a first induced voltage, so that power of the second oscillation circuit 303 can be transmitted to the first oscillation circuit 202.

In addition, a circuit part in the wireless charging receive apparatus 20 other than a receive coil, for example, the first receive coil 211, may be independently packaged into a chip and integrated on the PCB. In some embodiments of this application, the foregoing circuit part that is in the wireless charging receive apparatus 20 and that is manufactured on the PCB may include a first communication circuit 201, a first controller 205, and a first rectifier circuit 203 that are shown in FIG. 2b.

When the back of the electronic device 01 is placed on the charging cradle 02, wireless communication may be established between the wireless charging transmit apparatus 30 and the wireless charging receive apparatus 20. In this case, as shown in FIG. 2b, the wireless charging transmit apparatus 30 may include a second communication circuit 301. A wireless connection between the first communication circuit 201 and the second communication circuit 301 may be implemented by using Bluetooth (Bluetooth), wireless-fidelity (wireless-fidelity, Wi-Fi), a Zigbee (Zigbee) protocol, a radio frequency identification (radio frequency identification, RFID) technology, a long range (long range, Lora) wireless technology, and near field communication (near field communication, NFC), so that wireless communication can be established between the wireless charging transmit apparatus 30 and the wireless charging receive apparatus 20.

In this way, a control signal or charging data may be transmitted between the first communication circuit 201 and the second communication circuit 301. The charging data may be used to indicate a charging type. For example, the charging data may be a charging protocol, for example, a wireless charging standard Qi proposed by the Wireless Power Consortium (Wireless Power Consortium, WPC), for example, a BPP (basic power profile) protocol or an EPP (extended power profile) protocol.

In addition, as shown in FIG. 2b, the first communication circuit 201 is coupled to the first controller 205. The first controller 205 may identify a charging protocol sent by the second communication circuit 301 to the first communication circuit 201, to determine the charging type of the electronic device 01. For example, the charging type may be a first charging type (for example, low-power charging applicable to slow charging), or the charging type may be a second charging type (for example, high-power charging applicable to fast charging).

In addition, the first controller 205 is coupled to the first rectifier circuit 203. The first rectifier circuit 203 in this embodiment of this application may have two operating modes: a half-bridge mode and a full-bridge mode. When identifying, based on the charging data, that the charging type is the first charging type, the first controller 205 may output a first rectifier control signal, to control the first rectifier circuit 203 to operate in the half-bridge mode. The first rectifier circuit 203 in the half-bridge mode can reserve (or remove) a positive half-cycle waveform and remove (or reserve) a negative half-cycle waveform of a received alternating current waveform, to generate a direct current.

In addition, when identifying, based on the charging data, that the charging type is the second charging type, the first controller 205 may output a second rectifier control signal, to control the first rectifier circuit 203 to operate in the full-bridge mode. The first rectifier circuit 203 in the full-bridge mode can convert the positive half-cycle waveform and the negative half-cycle waveform that are of the received alternating current waveform into a same polarity, to generate the direct current.

As shown in FIG. 2b, the first rectifier circuit 203 is further coupled to the first receive coil 211. When operating in any one of the foregoing modes, the first rectifier circuit 203 may rectify the first induced voltage output by the first receive coil 211, to generate a direct current power supply voltage Vrect. The power supply voltage Vrect is used to supply power to the battery 50.

In some embodiments of this application, when a voltage value of the power supply voltage Vrect is the same as or approximately the same as a voltage value of a charging voltage (for example, 3.7 V) of the battery 50, the power supply voltage Vrect may directly charge the battery 50, as shown in FIG. 2b. In this case, after the power supply voltage Vrect is applied to the battery 50, a current output by the first rectifier circuit 203 may charge the battery 50.

Figure 2C:
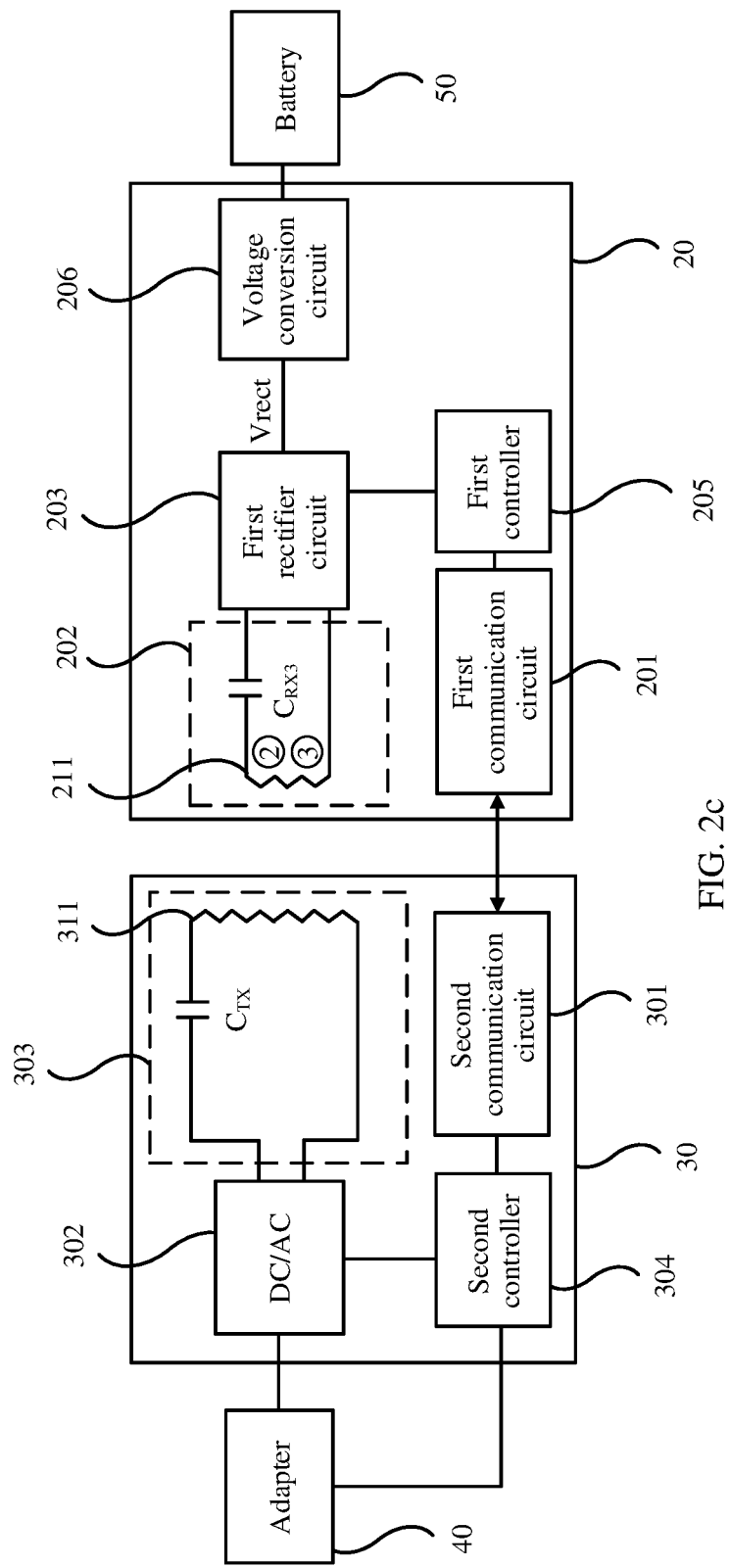
FIG. 2c is a schematic diagram of a structure of another wireless charging system according to an embodiment of this application.

Alternatively, in some other embodiments of this application, when the power supply voltage Vrect is greater than the charging voltage (for example, 3.7 V) of the battery 50, to avoid damage to the battery 50 caused when the power supply voltage Vrect is directly used to charge the battery 50, as shown in FIG. 2c, the wireless charging receive apparatus 20 further includes at least one level of voltage conversion circuit 206 coupled to the first rectifier circuit 203. The voltage conversion circuit 206 may be disposed on the PCB (as shown in FIG. 1a) in the electronic device 01. The voltage conversion circuit 206 may convert (for example, buck) the power supply voltage Vrect, and enable a converted voltage (for example, 3.7 V) to supply power to the battery 50. After the voltage output by the voltage conversion circuit 206 is applied to the battery 50, the current output by the first rectifier circuit 203 may charge the battery 50.

Therefore, that the power supply voltage Vrect is used to supply power to the battery 50 means that the power supply voltage Vrect may directly supply power to the battery 50 without causing damage to the battery 50. Alternatively, the power supply voltage Vrect may supply power to the battery 50 after being bucked by the at least one level of voltage conversion circuit 206.

In some embodiments of this application, the voltage conversion circuit 206 includes a DC/DC conversion circuit. The DC/DC conversion circuit may be a buck (Buck) circuit or a switched capacitor (switched capacitor, SC) circuit. An input-to-output voltage ratio of the buck circuit may be adjusted flexibly. For example, the input-to-output voltage ratio may be set as a decimal. An input-to-output voltage ratio of the SC circuit is an integer. However, the SC circuit can withstand a relatively high input-to-output voltage difference, and has relatively high voltage conversion efficiency.

Based on this, to improve a charging speed of the battery 50, charging power may be increased. In this case, when the wireless charging transmit apparatus 30 supports the second charging type (for example, high-power charging applicable to fast charging), the second communication circuit 301 may send, to the first communication circuit 201, a charging protocol that matches high-power charging. When the first controller 205 performs handshake identification of the charging protocol and identifies the charging protocol, the first controller 205 may send a first voltage adjustment instruction to the first communication circuit 201. The first voltage adjustment instruction is used to instruct to increase an output voltage of the second oscillation circuit 303.

In this case, as shown in FIG. 2c, the wireless charging transmit apparatus 30 further includes a second controller 304 coupled to the second communication circuit 301. In some embodiments of this application, the second controller 304 may be coupled to the DC/AC 302 and the adapter 40. After receiving the first voltage adjustment instruction output by the second communication circuit 301, the second controller 304 generates a first voltage adjustment control signal. The first voltage adjustment control signal is used to adjust an output voltage of the adapter 40, so as to increase the output voltage of the adapter 40.

In this way, when the output voltage of the adapter 40 increases, a direct current voltage output by the DC/AC 302 coupled to the adapter 40 also increases. In addition, after the DC/AC 302 converts the direct current output by the adapter 40 into an alternating current, and transmits the alternating current to the second oscillation circuit 303, the transmit coil 311 in the second oscillation circuit 303 can generate the high-frequency alternating current and transmit the alternating magnetic field. Therefore, when the direct current voltage output by the DC/AC 302 increases, the high-frequency alternating current generated on the transmit coil 311 also increases, thereby increasing the output voltage of the second oscillation circuit 303.

Figure 2D:
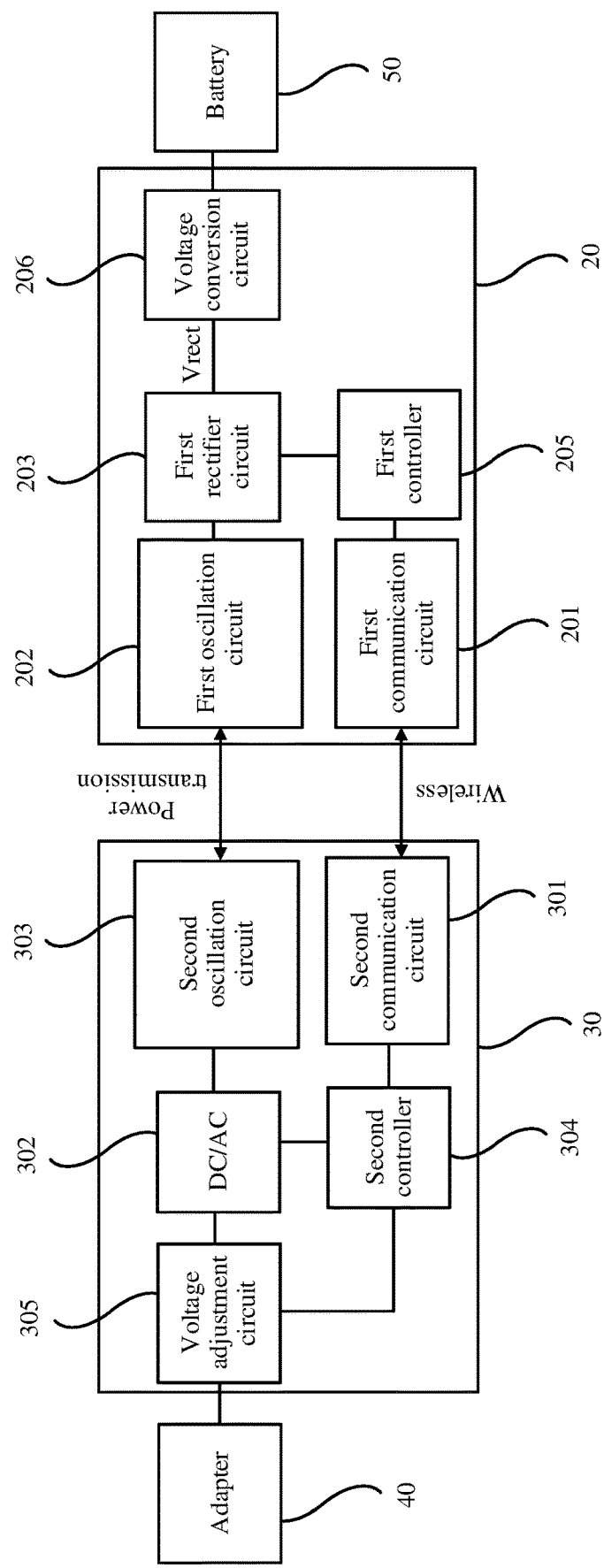
FIG. 2d is a schematic diagram of a structure of another wireless charging system according to an embodiment of this application.

Alternatively, in some other embodiments of this application, as shown in FIG. 2*d*, the wireless charging transmit apparatus 30 further includes a voltage adjustment circuit 305 coupled to the DC/AC 302 and the adapter 40. The voltage adjustment circuit 305 can adjust a voltage output by the adapter 40 to the DC/AC 302. After receiving the first voltage adjustment instruction output by the second communication circuit 301, the second controller 304 generates the first voltage adjustment control signal. The first voltage adjustment control signal is used to increase an output voltage of the voltage adjustment circuit 305. In this way, the direct current voltage output by the DC/AC 302 also increases, thereby increasing the output voltage of the second oscillation circuit 303.

It can be learned from the foregoing description that, to charge the battery 50, an output voltage of the voltage conversion circuit 206 is a third voltage (for example, 3.7 V) of the battery 50. Therefore, after the output voltage of the second oscillation circuit 303 increases, a voltage difference between an input voltage and an output voltage of the wireless charging receive apparatus 20 increases. In this case, to reduce heat generated by the wireless charging receive apparatus 20, the following describes in detail a structure of the wireless charging receive apparatus 20 provided in this embodiment of this application by using an example.

EXAMPLE 1

Figure 3A:
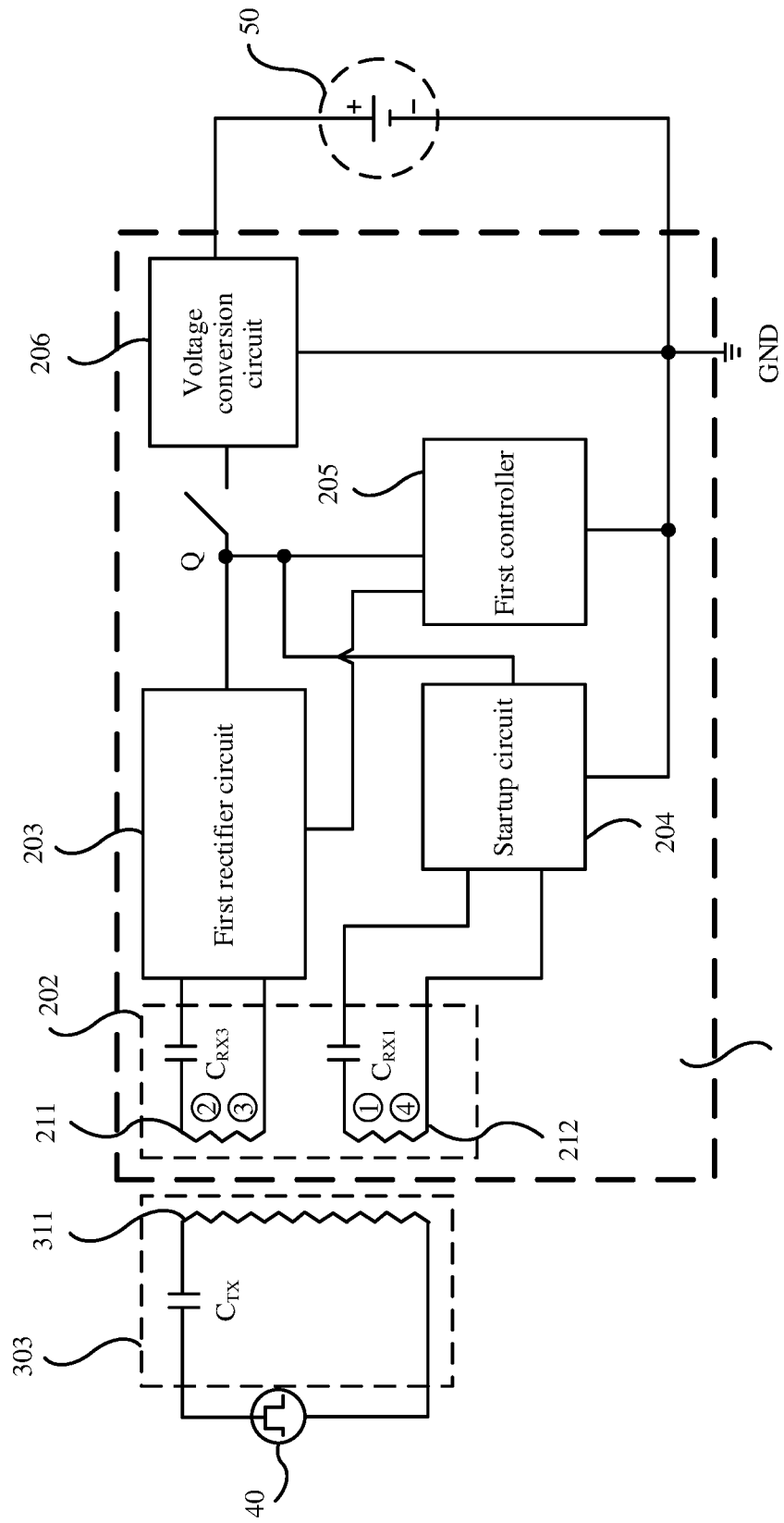
FIG. 3a is a schematic diagram of a structure of another wireless charging system according to an embodiment of this application.

In this example, as shown in FIG. 3*a*, the first oscillation circuit 202 in the wireless charging receive apparatus 20 may include the first receive coil 211. A voltage converter may be formed between the first receive coil 211 and the transmit coil 311.

A ratio U/U1 of a voltage U of an input end of the voltage converter (that is, an input voltage of the transmit coil 311) to a voltage U1 of an output end of the voltage converter (that is, an output voltage of the first receive coil 211) is equal to a ratio N/N1 of a quantity N of turns of the transmit coil 311 to a quantity N1 of turns of the first receive coil 211, that is, U/U1=N/N1.

In addition, a quantity of turns of a coil is directly proportional to a square of an inductance of the coil. Therefore, the ratio U/U1 of the input voltage to the output voltage of the voltage converter may be equal to a ratio of a square root of an inductance L of the transmit coil 311 to a square root of an inductance L1 of the first receive coil 211, as shown in the formula (1).

$$\frac{U}{U1} = \frac{\sqrt{L}}{\sqrt{L1}} \quad (1)$$

It can be learned from the foregoing description that, when the inductance of the transmit coil 311 is fixed, the inductance of the first receive coil 211 may be set, to adjust the ratio U/U1 of the input voltage to the output voltage of the voltage converter including the transmit coil 311 and the first receive coil 211. For example, when the voltage converter including the transmit coil 311 and the first receive coil 211 needs to implement a buck function, the inductance of the first receive coil 211 may be less than the inductance of the transmit coil 311 in the second oscillation circuit 303.

For ease of description, for example, when the inductance of the transmit coil 311 is L, the inductance L1 of the first receive coil 211 may be 1/n of the inductance L of the transmit coil 311, that is, L1=(1/n) L, where n≥2, and n is a positive integer.

In this case, it can be learned from the foregoing formula (1) that a ratio of the output voltage U1 of the first receive coil 211 to the input voltage U of the transmit coil 311 may be $\sqrt{(1/n)}$. For example, when n=4, that is, when the inductance L1 of the first receive coil 211 is ¼ of the inductance L of the transmit coil 311, a gain of the voltage converter including the transmit coil 311 and the first receive coil 211 may be 2:1. In this case, the voltage output by the first receive coil 211 may be half of the input voltage of the transmit coil 311, to reduce the output voltage of the first receive coil 211.

In this way, because the first rectifier circuit 203 is coupled to the first receive coil 211, after the output voltage of the first receive coil 211 decreases, an input voltage of the first rectifier circuit 203 can be decreased. This helps protect the first rectifier circuit 203.

In addition, when high-power charging is used, it can be learned from the foregoing description that the input voltage of the transmit coil 311 increases, for example, increases from 5 V during low-power charging to 10 V. In this case, after the 10 V voltage passes through the voltage converter including the transmit coil 311 and the first receive coil 211, the output voltage of the first receive coil 211 decreases to 5 V. In this case, compared with a solution in which the gain of the voltage converter including the transmit coil 311 and the first receive coil 211 is 1:1 and the output voltage of the first receive coil 211 is 10 V, the solution in this application can effectively reduce an input voltage of the voltage conversion circuit 206.

In addition, because the voltage output by the voltage conversion circuit 206 to the battery 50 is used to charge the battery 50, and a value of the voltage is fixed, for example, 3.7 V, when a voltage of an output end of the voltage conversion circuit 206 is fixed, a voltage difference between an input end and the output end of the voltage conversion circuit 206 may be reduced by reducing a voltage of the input end of the voltage conversion circuit 206. Therefore, heat generated by the voltage conversion circuit 206 in a voltage conversion process and a loss caused by the heat in the voltage conversion process can be reduced, thereby improving voltage conversion efficiency of the voltage conversion circuit 206, and helping improve efficiency of high-power power supply.

In addition, it can be learned from the foregoing description that the first controller 205 may identify the charging protocol received by the first communication circuit 201. Therefore, to start the wireless charging receive apparatus 20, power needs to be supplied to the first controller 205. In some embodiments of this application, as shown in FIG. 3a, the first controller 205 may be coupled to an output end of the first rectifier circuit 203. In this way, when the output end of the first rectifier circuit 203 outputs a voltage, the voltage may supply power to the first controller 205, so that the first controller 205 can output the first rectifier control signal or the second rectifier control signal to the first rectifier circuit 203.

However, it can be learned from the foregoing description that, to reduce the output voltage of the first receive coil 211, the inductance of the first receive coil 211 is less than the inductance of the transmit coil 311 in the second oscillation circuit 303. In addition, when the voltage output by the first receive coil 211 is relatively low, a voltage output after rectification by the first rectifier circuit 203 is insufficient to start the first controller 205. As a result, wireless charging cannot be performed.

To resolve the foregoing problem, the first oscillation circuit 202 of the wireless charging receive apparatus 20 provided in this embodiment of this application further includes a second receive coil 212 and a startup circuit 204 coupled to the second receive coil 212 and the first controller 205 that are shown in FIG. 3a. The startup circuit 204 may be disposed on the PCB (as shown in FIG. 1B) in the electronic device 01. The second receive coil 212 may receive the alternating magnetic field transmitted by the transmit coil 311 and output a second induced voltage. Therefore, similarly, the transmit coil 311 and the second receive coil 212 may also form another voltage converter.

The startup circuit 204 may convert the second induced voltage output by the second receive coil 212 into a direct current first voltage Vc. The first voltage Vc may be greater than or equal to a minimum operating voltage of the first controller 205, that is, a voltage in an under voltage lock out (UVLO) state. In this way, the first voltage Vc may supply power to the first controller 205, so that the first controller 205 outputs the first rectifier control signal or the second rectifier control signal to the first rectifier circuit 203. The first rectifier circuit 203 that operates in the half-bridge mode under control of the first rectifier control signal or the first rectifier circuit 203 that operates in the full-bridge mode under control of the second rectifier control signal may convert the voltage output by the first receive coil 211 into the power supply voltage Vrect.

In this case, to enable the second induced voltage output by the second receive coil 212 to drive, after being converted by the startup circuit 204, the first controller 205 to output the first rectifier control signal or the second rectifier control signal, an inductance of the second receive coil 212 may be greater than the inductance of the first receive coil 211.

It should be noted that when the electronic device 01 is placed on the cradle 02 and just starts to be charged, because the wireless charging receive apparatus 20 just starts to perform a charging process, the voltage input by the transmit coil 311 is a fixed value. Therefore, when there is a relatively large deviation in an alignment position of the second receive coil 212 and the transmit coil 311 in the cradle 02, the second induced voltage output by the second receive coil 212 is low. Therefore, when a position deviation between the second receive coil 212 and the transmit coil 311 reaches a preset maximum value, for example, 10 mm, it can still be ensured that the second induced voltage output by the second receive coil 212 drives, after being converted by the startup circuit 204, the first controller 205 to output the first rectifier control signal or the second rectifier control signal.

The inductance of the second receive coil 212 may be four times the inductance of the first receive coil 211.

In addition, the inductance of the second receive coil 212 may be greater than the inductance of the transmit coil 311, or may be less than the inductance of the transmit coil 311, or may be the same as or approximately the same as the inductance of the transmit coil 311. This is not limited in this application, provided that the voltage converter including the transmit coil 311 and the second receive coil 212 can ensure that the second induced voltage output by the second receive coil 212 can drive, after being converted by the startup circuit 204, the first controller 205 to output the first rectifier control signal or the second rectifier control signal. For ease of description below, the inductance of the second receive coil 212 may be the same as the inductance of the transmit coil 311. In this case, a gain of the voltage converter including the second receive coil 212 and the transmit coil 311 may be 1:1.

Figure 3B:
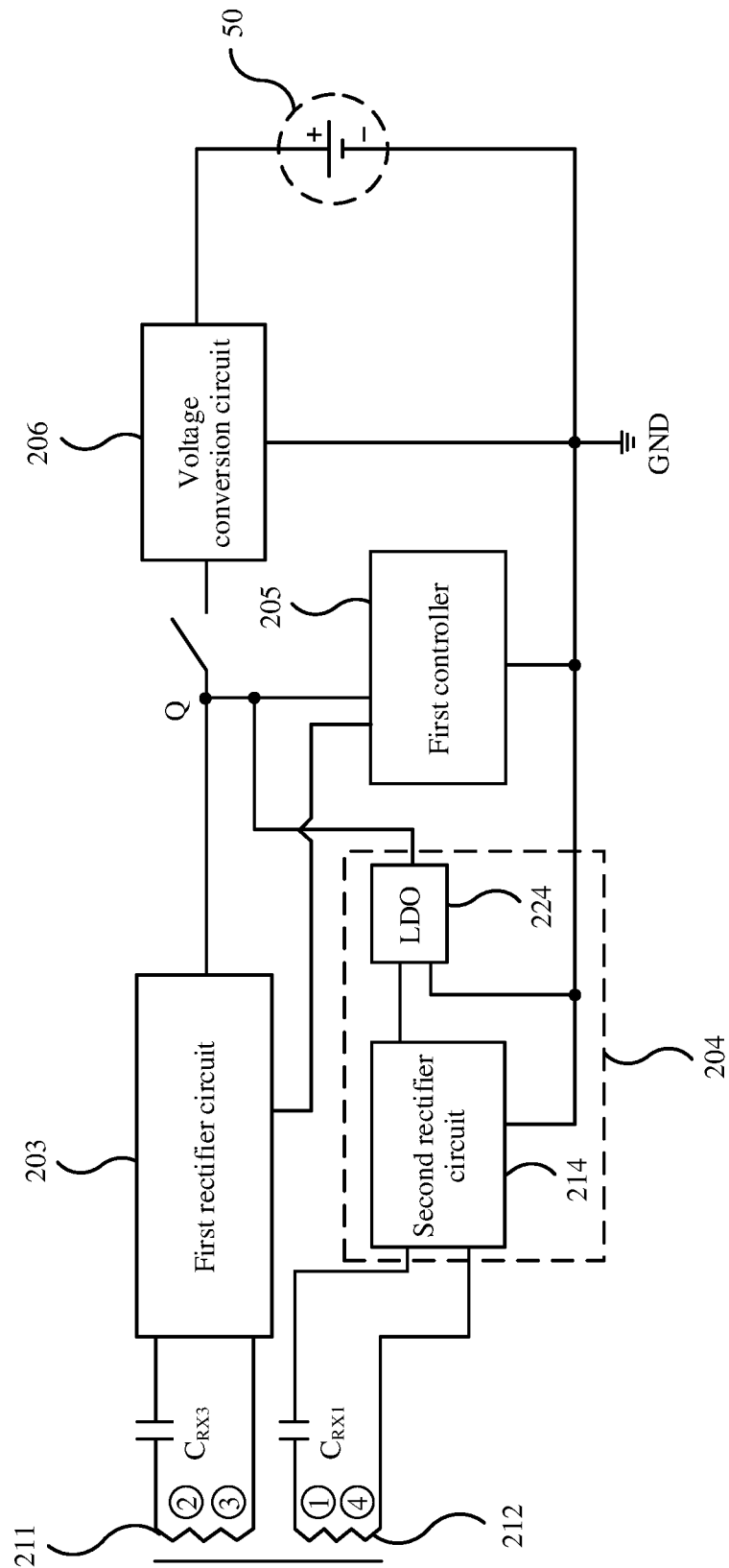
FIG. 3b is a schematic diagram of a structure of another wireless charging system according to an embodiment of this application.

In some embodiments of this application, as shown in FIG. 3b, the startup circuit 204 may include a second rectifier circuit 214 and a second voltage regulator circuit 224. For example, the second voltage regulator circuit 224 may be a low dropout regulator (low dropout regulator, LDO).

The second rectifier circuit 214 is coupled to the second receive coil 212 and the second voltage regulator circuit 224. The second voltage regulator circuit 224 is further coupled to the first controller 205 and a ground terminal GND. That is, as shown in FIG. 3b, output ends of the second voltage regulator circuit 224, the first controller 205, and the first rectifier circuit 203 are all coupled to a node Q.

In this case, the second rectifier circuit 214 may rectify an alternating current output by the second receive coil 212, to generate a direct current. After the second voltage regulator circuit 224 performs voltage regulation processing on the direct current, the second voltage regulator circuit 224 may output the first voltage Vc to the foregoing node Q. The first voltage Vc supplies power to the first controller 205.

As shown in FIG. 3b, the first controller 205 is further coupled to the output end of the first rectifier circuit 203. In a case in which the first controller 205 outputs the first rectifier control signal or the second rectifier control signal to the first rectifier circuit 203, so that the first rectifier circuit 203 outputs the power supply voltage Vrect, when the power supply voltage Vrect is greater than a preset regulation voltage V1 of the second voltage regulator circuit 224, an output end of the second voltage regulator circuit 224 may be in a disconnected state, so that the startup circuit 204 may be cut off, and the startup circuit 204 stops supplying power to the first controller 205. In this case, because the first controller 205 is coupled to the output end of the first rectifier circuit 203, the first rectifier circuit 203 may output the power supply voltage Vrect to the node Q. The power supply voltage Vrect may supply power to the first controller 205.

It should be noted that the preset regulation voltage V1 of the second voltage regulator circuit 224 may be set based on a parameter of the first controller 205, for example, the foregoing UVLO voltage, before the electronic device 01 is delivered from a factory. It can be learned from the foregoing description that the first voltage Vc output by the startup circuit 204 needs to be greater than or equal to the UVLO voltage. Therefore, the preset regulation voltage V1 may be greater than the first voltage Vc, so that when the power supply voltage Vrect output by the first rectifier circuit 203 is greater than the preset regulation voltage V1 of the second voltage regulator circuit 224, the output end of the second voltage regulator circuit 224 may be in a disconnected state, that is, the output end of the second voltage regulator circuit 224 is disconnected from the node Q.

It can be learned from the foregoing description that, when the output end of the second voltage regulator circuit 224 is coupled to the node Q, the second voltage regulator circuit 224 is configured to supply power to the node Q. When the output end of the second voltage regulator circuit 224 is disconnected from the node Q, the first rectifier circuit 203 supplies power to the node Q. Therefore, at a same moment, the node Q has only one voltage, and the voltage can supply power to the first controller 205.

Figure 4:
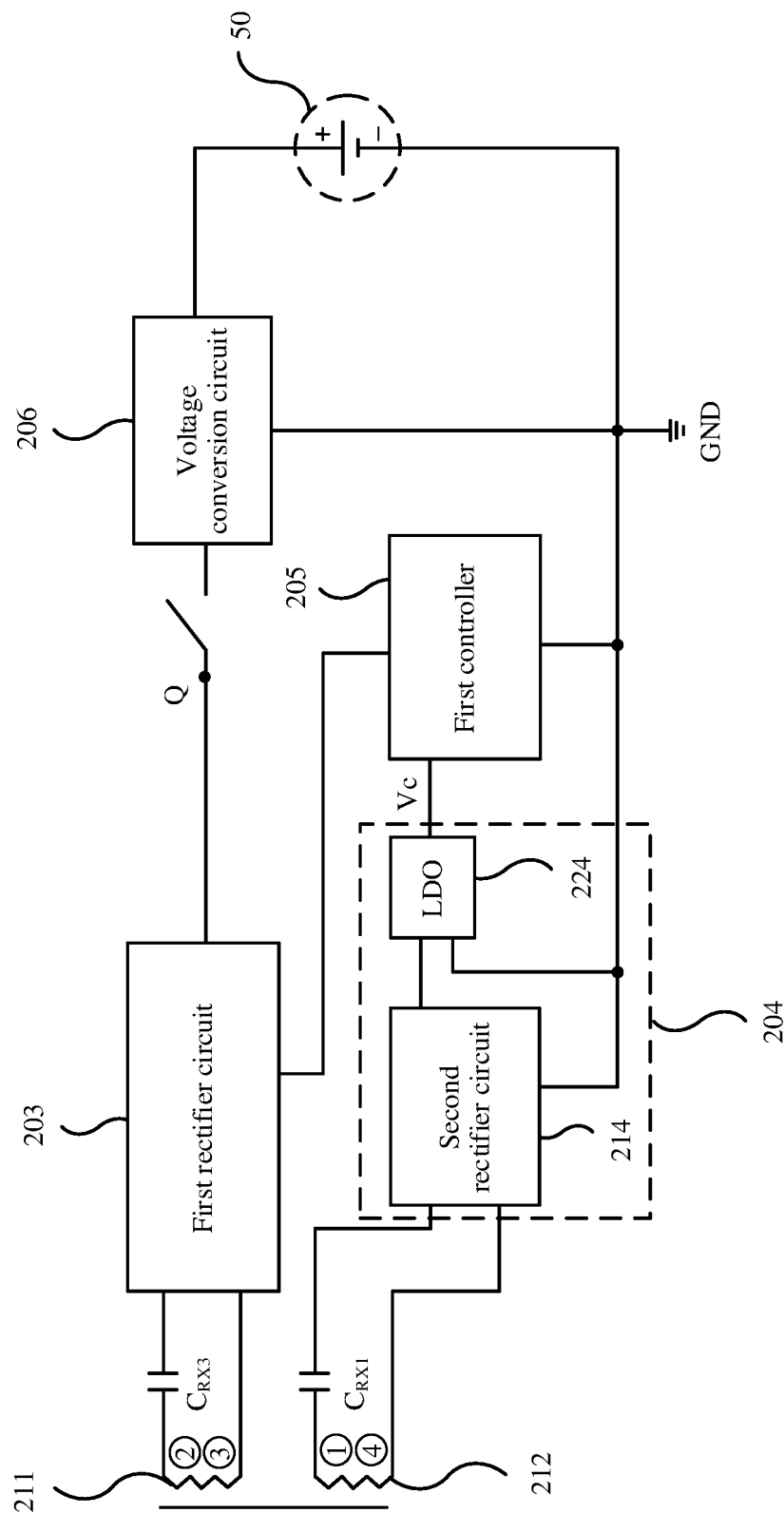
FIG. 4 is a schematic diagram of a structure of another wireless charging system according to an embodiment of this application.

Alternatively, in some other embodiments of this application, as shown in FIG. 4, the output end of the second voltage regulator circuit 224 in the startup circuit 204 is coupled to an input end of the first controller 205. In this way, in an operating process of the wireless charging receive apparatus 20, the startup circuit 204 always provides the first voltage Vc for the first controller 205.

It should be noted that, in the charging process of the electronic device 01, when the startup circuit 204 is always on, the second receive coil 212 always receives the alternating magnetic field transmitted by the transmit coil 311, and generates the second induced voltage. Although heat is generated in a process in which the second receive coil 212 outputs the second induced voltage, in a wireless charging process, impact of the heat generated by the coil on charging power consumption is relatively small and may be ignored.

For ease of description, the following uses an example in which the output ends of the second voltage regulator circuit 224, the first controller 205, and the first rectifier circuit 203 are all coupled to the node Q in the structure shown in FIG. 3b for description.

It can be learned from the foregoing description that, the voltage converter including the transmit coil 311 and the second receive coil 212 can ensure that the second induced voltage output by the second receive coil 212 can drive, after being converted by the startup circuit 204, the first controller 205 to output the first rectifier control signal or the second rectifier control signal. At the same time, the voltage converter including the transmit coil 311 and the first receive coil 211 can reduce the output voltage of the first receive coil 211. The inductance of the first receive coil 211 in the first oscillation circuit 202 is less than the inductance of the second receive coil 212.

In some embodiments of this application, the first receive coil 211 and the second receive coil 212 may be wound by using metal cables of a same type. A difference lies in that a quantity of circles of winding the first receive coil 211 may be less than a quantity of circles of winding the second receive coil 212, and therefore, the inductance of the first receive coil 211 may be less than the inductance of the second receive coil 212.

Alternatively, in some other embodiments of this application, the first receive coil 211 may be wound by using a relatively thick metal cable, and the second receive coil 212 may be wound by using a relatively thin metal cable. In addition, a quantity of circles of winding the first receive coil 211 may be less than a quantity of circles of winding the second receive coil 212. For example, when the inductance of the first receive coil 211 is half of the inductance of the second receive coil 212, the quantity of circles of winding the first receive coil 211 may be or approximate to half of the quantity of circles of winding the second receive coil 212. Other winding manners of the first receive coil 211 and the second receive coil 212 are not described herein one by one, provided that the inductance of the first receive coil 211 can be less than the inductance of the second receive coil 212.

Figure 5A:
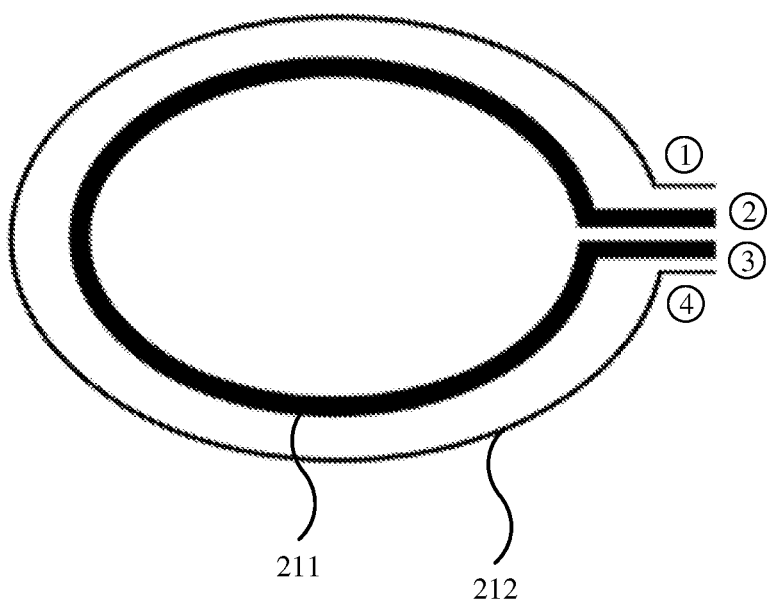
FIG. 5a is a schematic diagram of a winding manner of a first receive coil and a second receive coil according to an embodiment of this application.

In addition, in some embodiments of this application, as shown in FIG. 5a, the first receive coil 211 may be disposed inside the second receive coil 212. In this case, a first end ② and a second end ③ of the first receive coil 211 are located between a first end ① end ④ of the second receive coil 212.

Figure 5B:
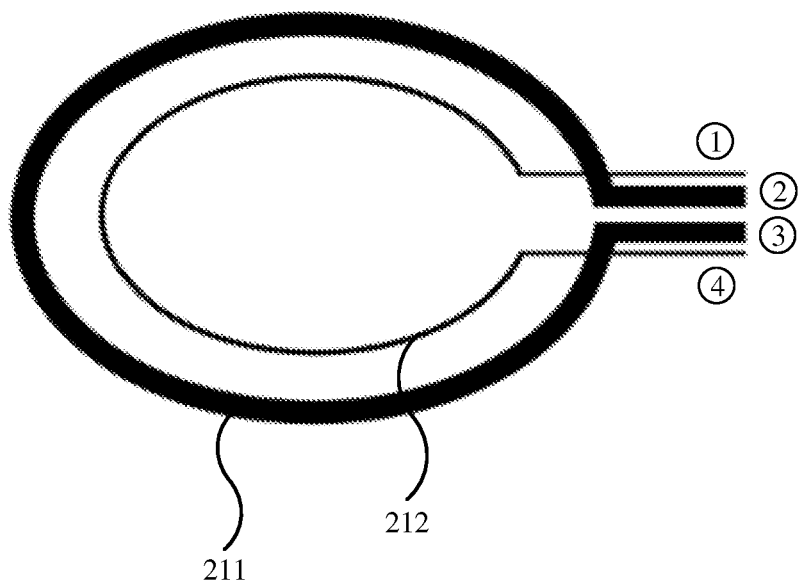
FIG. 5b is a schematic diagram of another winding manner of a first receive coil and a second receive coil according to an embodiment of this application.

Alternatively, in some other embodiments of this application, as shown in FIG. 5b, the second receive coil 212 is disposed inside the first receive coil 211. A first end ② and a second end ⑥ of the first receive coil 211 are located between a first end ① and a second end ④ of the second receive coil 212.

Figure 5C:
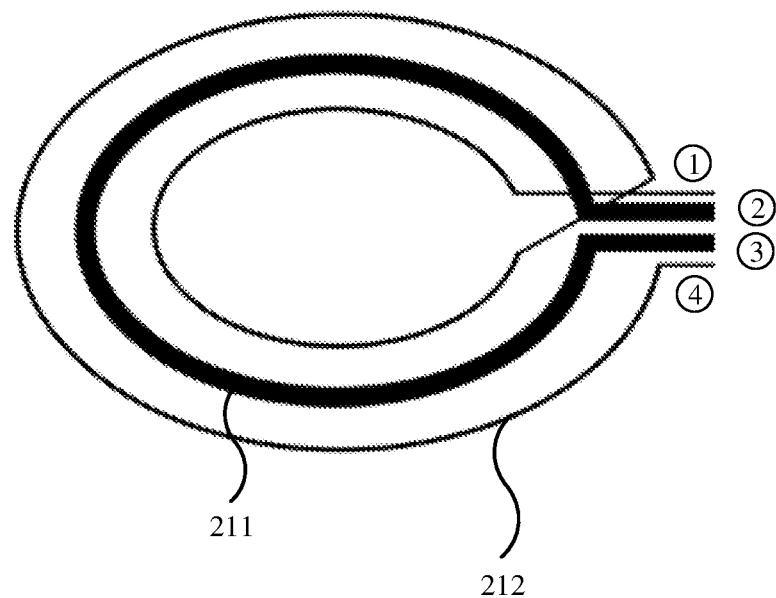
FIG. 5c is a schematic diagram of another winding manner of a first receive coil and a second receive coil according to an embodiment of this application.

Alternatively, in still other embodiments of this application, as shown in FIG. 5c, one part of the second receive coil 212 is disposed inside the first receive coil 211, and the other part is disposed outside the first receive coil 211. A first end ② and a second end ③ of the first receive coil 211 are located between a first end ① and a second end ④ of the second receive coil 212.

Figure 6A:
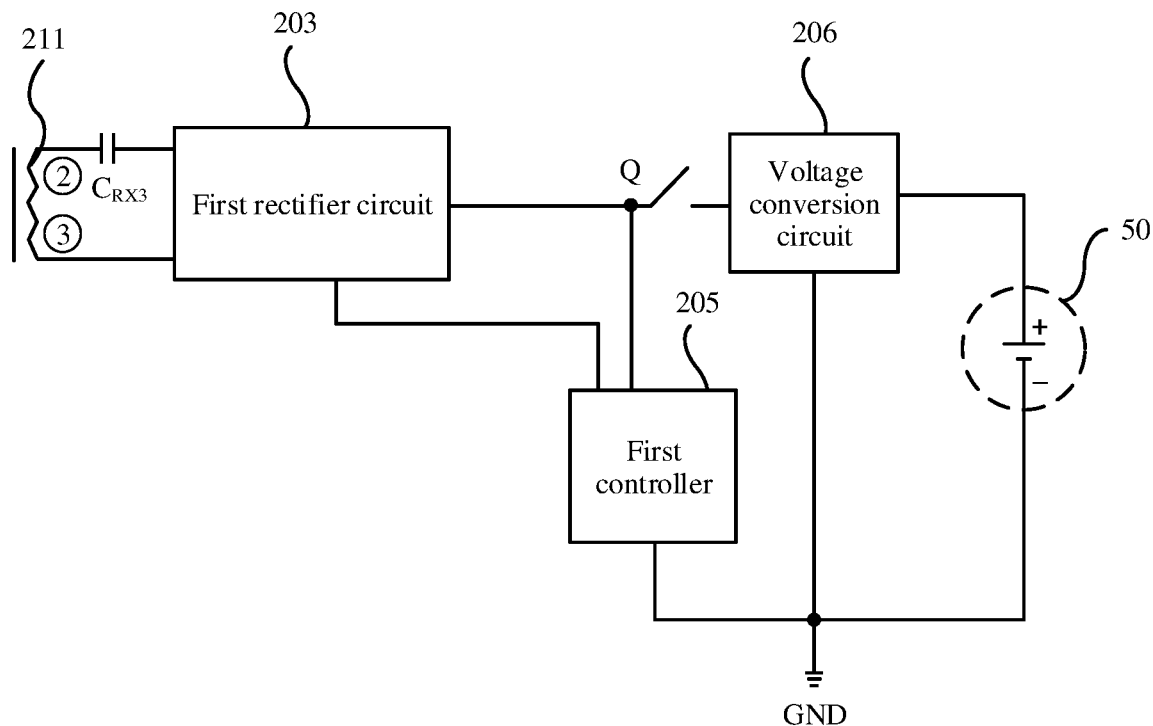
FIG. 6a is a schematic diagram of another structure of a wireless charging receive apparatus according to an embodiment of this application.

It should be noted that the foregoing is described by using an example in which the second receive coil 212 and the startup circuit 204 are disposed in the wireless charging receive apparatus 20 to drive the first controller 205. In some embodiments of this application, when the electronic device 01 is charged, and positions of the transmit coil 311 and the first receive coil 211 are aligned, the voltage output by the first rectifier circuit 203 is sufficient to start the first controller 205. In this case, neither of the second receive coil 212 and the startup circuit 204 needs to be disposed in the wireless charging receive apparatus 20. In this case, a structure of the wireless charging receive apparatus 20 is shown in FIG. 6a. The voltage output by the first rectifier circuit 203 may directly drive the first controller 205, so that the first controller 205 outputs the first rectifier control signal or the second rectifier control signal to the first rectifier circuit 203.

Figure 6B:
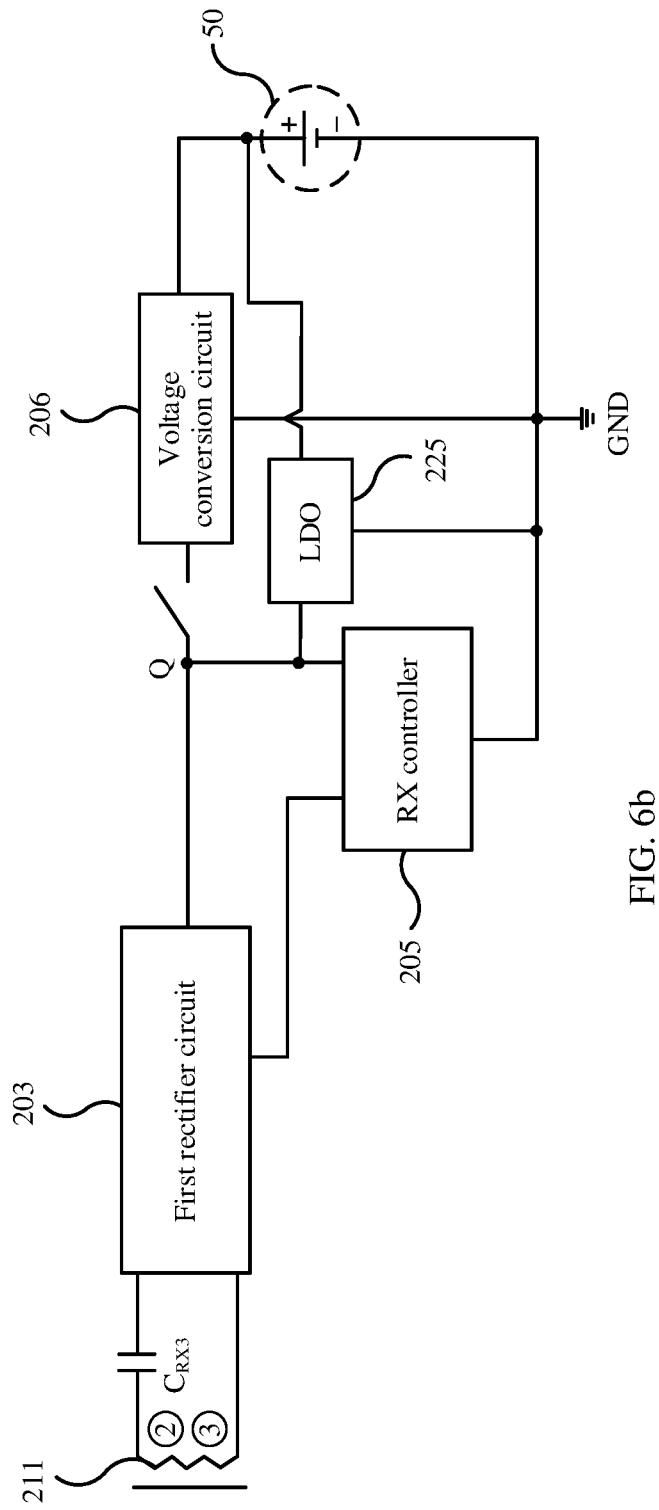
FIG. 6b is a schematic diagram of another structure of a wireless charging receive apparatus according to an embodiment of this application.

Alternatively, in some other embodiments of this application, as shown in FIG. 6b, the wireless charging receive apparatus further includes a first voltage regulator circuit 225. The first voltage regulator circuit 225 may be disposed on the PCB in the electronic device 01. The first voltage regulator circuit 225 may be coupled to two ends of the battery 50 and the first controller 205. The first voltage regulator circuit 225 is configured to transmit a voltage of the battery 50 to the first controller 205, to supply power to the first controller 205. In this way, when remaining power in the battery 50 is sufficient to drive the first controller 205, the remaining power in the battery 50 may be used to drive the first controller 205.

In addition, when the power supply voltage Vrect output by the first rectifier circuit 203 is greater than a preset regulation voltage V2 of the first voltage regulator circuit 225, the first voltage regulator circuit 225 is configured to disconnect the battery 50 from the first controller 205. That is, an output end of the first voltage regulator circuit 225 is disconnected from the node Q. In this case, because the first controller 205 is coupled to the output end of the first rectifier circuit 203, the first rectifier circuit 203 may output the power supply voltage Vrect to the node Q. The power supply voltage Vrect may supply power to the first controller 205, so that the first controller 205 outputs the first rectifier control signal or the second rectifier control signal to the first rectifier circuit 203. A setting manner of the preset regulation voltage V2 of the first voltage regulator circuit 225 is similar to the setting manner of the preset regulation voltage V1 of the second voltage regulator circuit 224. Details are not described herein again.

A manner of starting the first controller 205 is not limited in this application. For ease of description, structures of the first rectifier circuit 203 and the second rectifier circuit 214 are described in detail below by using an example in which the second receive coil 212 and the startup circuit 204 are disposed in the wireless charging receive apparatus 20 to drive the first controller 205.

Figure 7:
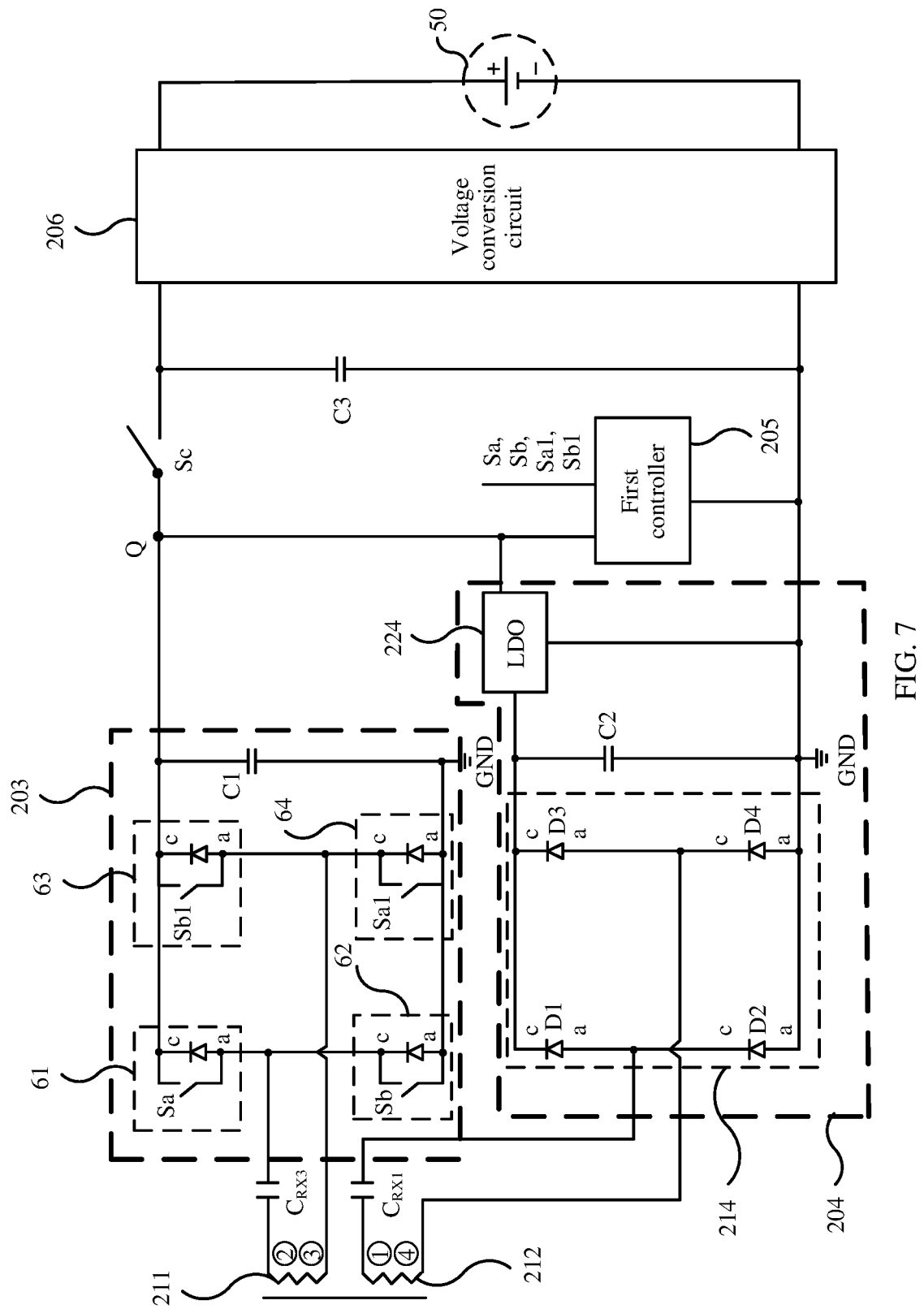
FIG. 7 is a schematic diagram of another structure of a wireless charging receive apparatus according to an embodiment of this application.

As shown in FIG. 7, the first rectifier circuit 203 includes a first bridge arm and a second bridge arm that are connected in parallel. The first bridge arm includes a first switch component 61 and a second switch component 62 that are connected in series. The second bridge arm includes a third switch component 63 and a fourth switch component 64 that are connected in series. Any one of the first switch component 61, the second switch component 62, the third switch component 63, and the fourth switch component 64 includes a diode and a switch transistor connected in parallel to the diode. For example, the first switch component 61 includes a switch transistor Sa, the second switch component 62 includes a switch transistor Sb, the third switch component 63 includes a switch transistor Sa1, and the fourth switch component 64 includes a switch transistor Sb1.

The first end ② of the first receive coil 211 is coupled between the first switch component 61 and the second switch component 62. In other words, the first end ② of the first receive coil 211 is coupled between an anode (anode, a) of a diode in the first switch component 61 and a cathode (cathode, c) of a diode in the second switch component 62.

It can be learned from the foregoing description that, the first oscillation circuit 202 further includes the third resonant capacitor $C_{RX3}$. A first end of the third resonant capacitor $C_{RX3}$ is coupled to the first end ② of the first receive coil 211, and a second end of the third resonant capacitor $C_{RX3}$ is coupled between the first switch component 61 and the second switch component 62. Therefore, the first end ② of the first receive coil 211 is coupled between the first switch component 61 and the second switch component 62 by using the third resonant capacitor $C_{RX3}$.

In addition, the second end ③ of the first receive coil 211 is coupled between the third switch component 63 and the fourth switch component 64. In other words, the second end ② of the first receive coil 211 is coupled between an anode a of a diode in the third switch component 63 and a cathode c of a diode in the fourth switch component 64.

Based on this, to enable the first rectifier circuit 203 to output the power supply voltage Vrect under control of the first rectifier control signal or the second rectifier control signal that is output by the first controller 205, a control end of the first switch component 61 (that is, a control end of the switch transistor Sa), a control end of the second switch component 62 (that is, a control end of the switch transistor Sb), a control end of the third switch component 63 (that is, a control end of the switch transistor Sb1), and a control end of the fourth switch component 64 (that is, a control end of the switch transistor Sa1) are all coupled to the first controller 205. In this case, the first controller 205 may control connection or cutoff of the switch transistor Sa, the switch transistor Sb, the switch transistor Sb1, and the switch transistor Sa1.

The first rectifier circuit 203 further includes a first filter capacitor C1. A first end of the first filter capacitor C1 is coupled to a cathode c of the diode in the first switch component 61, and a second end of the first filter capacitor C1 is coupled to the ground terminal GND.

In addition, in this example, as shown in FIG. 7, a structure of the second rectifier circuit 214 of the startup circuit 204 may include a first diode D1 and a second diode D2 that are connected in series, and a third diode D3 and a fourth diode D4 that are connected in series. A cathode c of the first diode D1 and a cathode c of the third diode D3 are coupled to each other, so as to be coupled to the second voltage regulator circuit 224 as an output end of the second rectifier circuit 214. An anode a of the second diode D2 and an anode a of the fourth diode D4 are both coupled to the ground terminal GND.

The first oscillation circuit 202 further includes a first resonant capacitor $C_{RX1}$ shown in FIG. 7. A first end of the first resonant capacitor $C_{RX1}$ is coupled to the first end ① of the second receive coil 212, and a second end of the first resonant capacitor $C_{RX1}$ is coupled to an anode a of the first diode D2 and a cathode c of the second diode D2. The second end ④ of the second receive coil 212 is coupled to an anode a of the third diode D2 and a cathode c of the fourth diode D4.

In addition, the second rectifier circuit 214 may further include a second filter capacitor C2. A first end of the second filter capacitor C2 is coupled to the cathode c of third diode D3, and a second end of the second filter capacitor C2 is coupled to the ground terminal GND.

Figure 8:
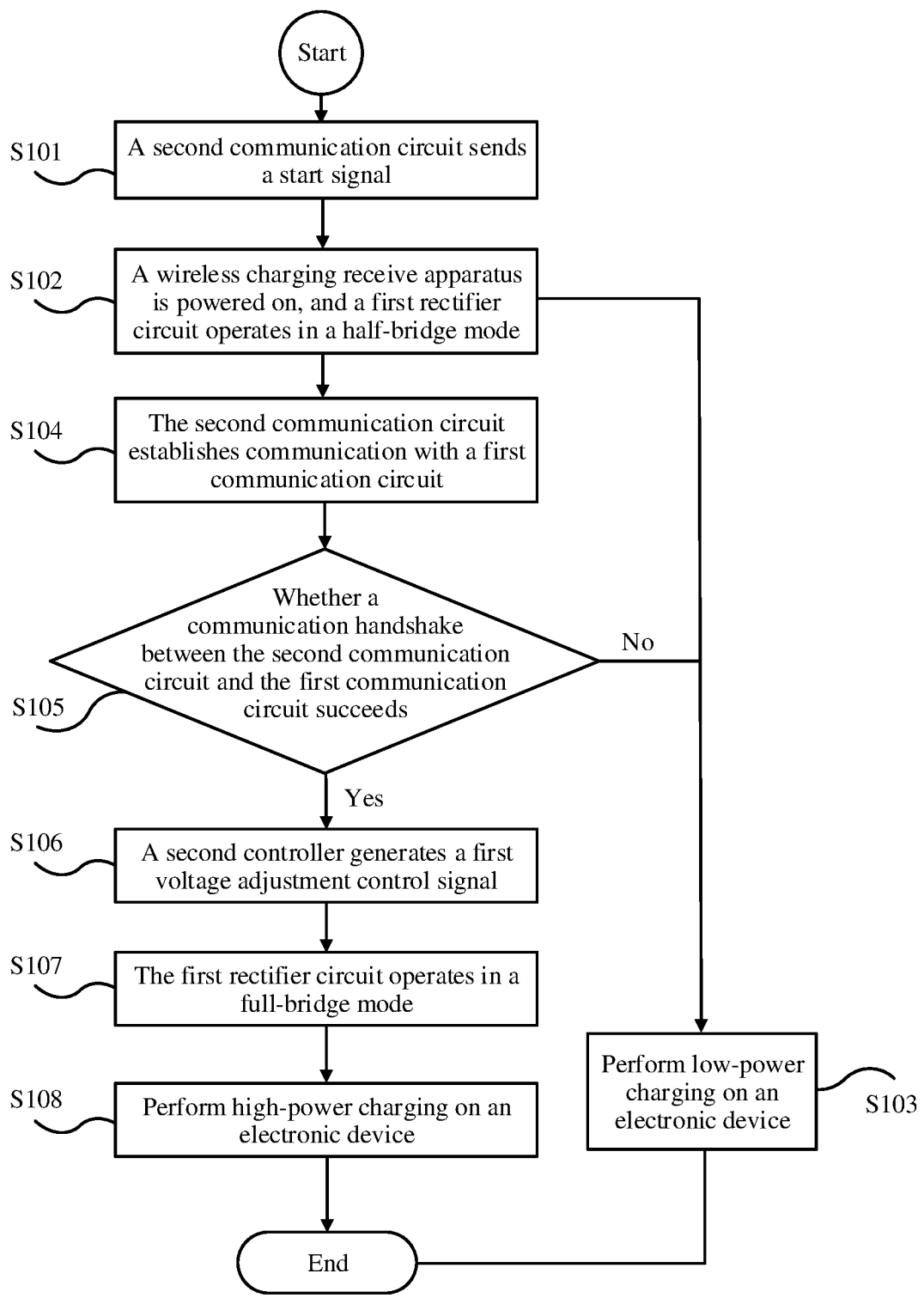
FIG. 8 is a flowchart of a wireless charging control method according to an embodiment of this application.

The following describes in detail a control method for the wireless charging system that has the wireless charging transmit apparatus 30 and the wireless charging receive apparatus 20 shown in FIG. 7 by using an example. As shown in FIG. 8, the control method includes S101 to S108.

S101: The second communication circuit 301 in the wireless charging transmit apparatus 30 sends a start signal (which may be referred to as a Ping signal), and the wireless charging receive apparatus 20 is started.

S102: The wireless charging receive apparatus 20 is powered on, and the first rectifier circuit 203 operates in a half-bridge mode.

After the first communication circuit 201 in the wireless charging receive apparatus 20 receives the Ping signal, the wireless charging receive apparatus 20 powers on some internal components, for example, the startup circuit 204, of the wireless charging receive apparatus 20 according to a set power-on time sequence. In this case, the startup circuit 204 may convert an alternating current output by the second receive coil 212 into a direct current first voltage Vc. After receiving the first voltage Vc, the first controller 205 in the wireless charging receive apparatus 20 may output a first rectifier control signal, to control the first rectifier circuit 203 to operate in the half-bridge mode.

Figure 9A:
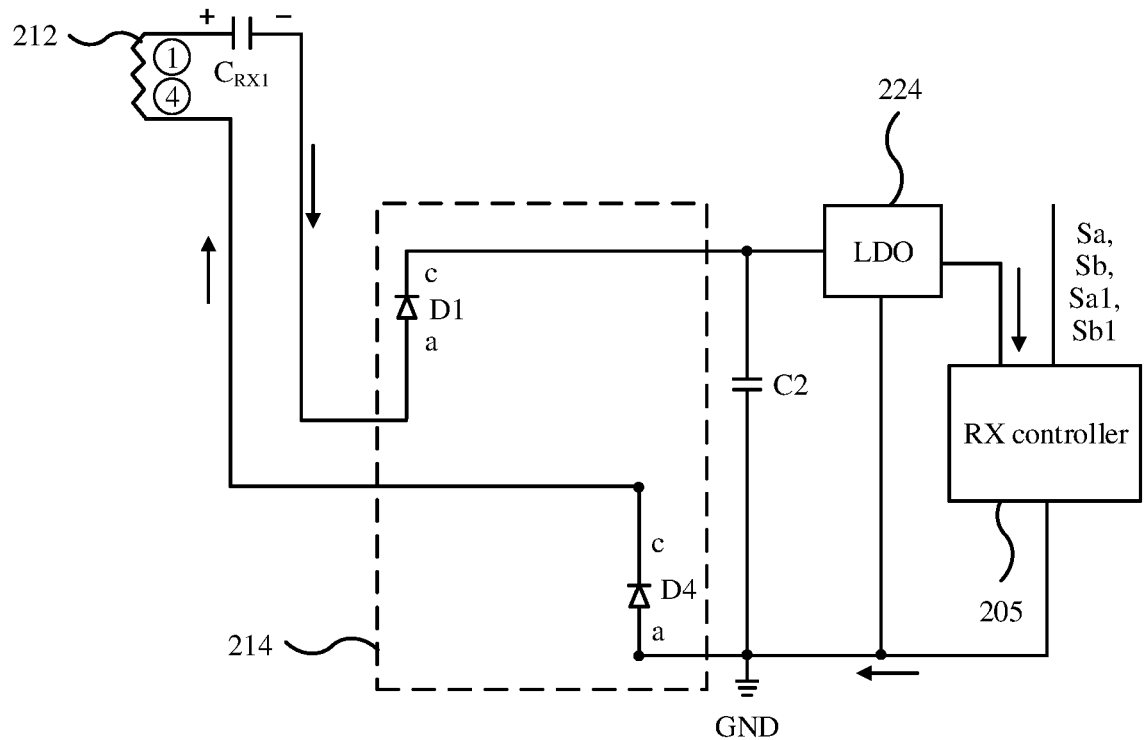
FIG. 9a is a schematic diagram of an operating mode of a startup circuit in FIG. 7.

For example, when the second rectifier circuit 214 in the startup circuit 204 includes the first diode D1, the second diode D2, the third diode D3, and the fourth diode D4 that are shown in FIG. 7, the second rectifier circuit 214 may be a full-bridge rectifier circuit. Based on this, when a polarity (a positive electrode is represented by +, and a negative electrode is represented by −) of a second induced voltage on the second receive coil 212 is shown in FIG. 9a, an induced voltage on the second receive coil 212 generates the first voltage Vc by using a loop formed by the first diode D1 and the fourth diode D4, and provides the first voltage Vc for the first controller 205.

Figure 9B:
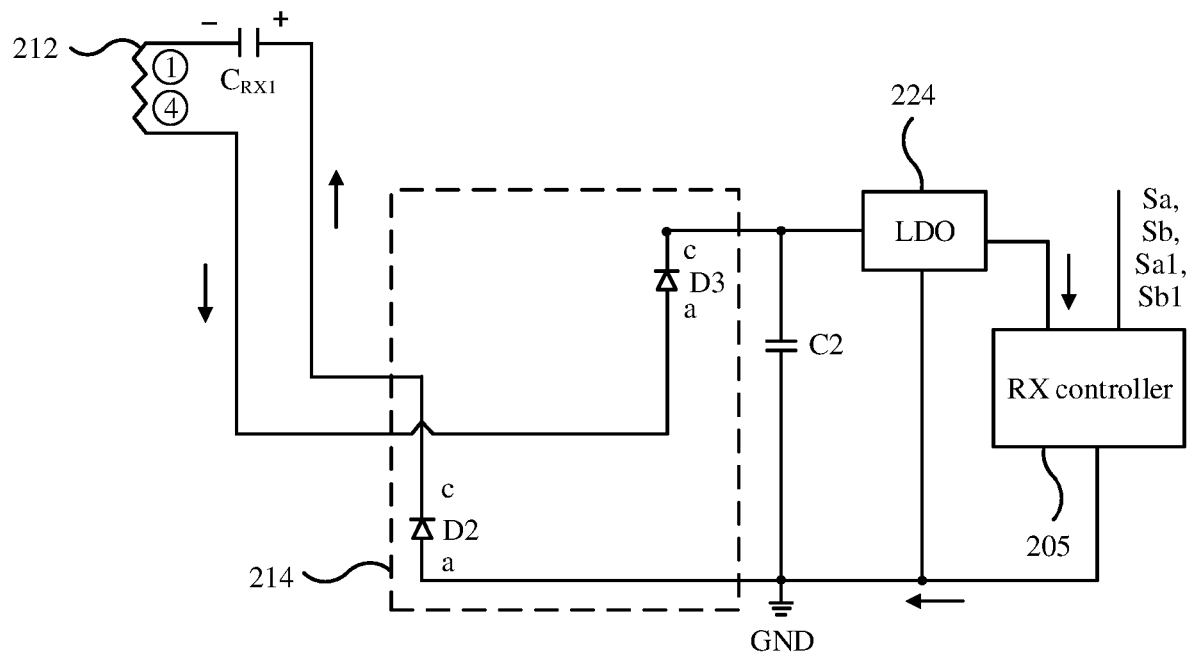
FIG. 9b is a schematic diagram of another operating mode of a startup circuit in FIG. 7.

In addition, when the polarity of the second induced voltage on the second receive coil 212 is switched, as shown in FIG. 9b, the induced voltage on the second receive coil 212 generates the first voltage Vc by using a loop formed by the second diode D2 and the third diode D3, and provides the first voltage Vc for the first controller 205. In this case, an input-to-output voltage ratio of the full-bridge second rectifier circuit 214 is 1:1.

Based on this, to increase a value of the first voltage Vc output by the startup circuit 204, so that the first controller 205 receiving the first voltage Vc can output the first rectifier control signal, in some embodiments of this application, an inductance of the second receive coil 212 may be increased, for example, the inductance of the second receive coil 212 is equivalent to an inductance of the transmit coil 311. In this case, when component space of the electronic device 01 is sufficient, a quantity of circles of a metal cable for winding the second receive coil 212 may be increased.

Alternatively, in some other embodiments of this application, the second voltage regulator circuit 224 may be replaced with a DC/DC converter having boost (boost) and buck functions. In this way, the DC/DC converter may boost a voltage output by the second rectifier circuit 214, so that the first voltage Vc output by the startup circuit 204 can meet a requirement for starting the first controller 205.

In a process in which the electronic device 01 is placed on the cradle 02 for high-power charging, because an input voltage of the transmit coil 311 increases, if a position of the second receive coil 212 is not aligned with a position of the transmit coil 311 and a relatively large offset exists, the second induced voltage generated by the second receive coil 212 also increases. Therefore, the first voltage Vc generated by the startup circuit 204 based on the induced voltage generated by the second receive coil 212 is greater than a maximum operating voltage of the first controller 205. In this case, to avoid damage to the first controller 205 due to an excessively high voltage output by the startup circuit 204, the DC/DC converter may further buck the voltage output by the second rectifier circuit 214, so that the first voltage Vc output by the startup circuit 204 is less than the maximum operating voltage of the first controller 205.

Based on this, after the startup circuit 204 outputs the first voltage Vc that meets a design requirement to the first controller 205, the first controller 205 is in an operating state, and the startup circuit 204 outputs the first rectifier control signal to the first rectifier circuit 203, so as to control the first rectifier circuit 203 to operate in the half-bridge mode, and outputs a power supply voltage Vrect.

S103: Perform low-power charging on the electronic device 01.

The wireless charging system provided in this embodiment of this application may support a first charging type by default, for example, low-power charging applicable to slow charging, and a voltage provided by the transmit coil 311 is, for example, 5 V. For example, it can be learned from the foregoing description that a gain of a voltage converter including the transmit coil 311 and the first receive coil 211 may be 2:1. Therefore, a voltage output by the first receive coil 211 may be 2.5 V. In this case, the voltage output by the first receive coil 211 is excessively low, and cannot meet a charging requirement of the battery 50 (for example, a third voltage at both ends of the battery 50 may be 3.7 V). Therefore, in a process of rectifying an alternating current output by the first receive coil 211, the first rectifier circuit 203 further needs to boost the voltage output by the first receive coil 211.

In this case, after the first controller 205 just starts to receive the first voltage Vc output by the startup circuit 204, the output first rectifier control signal may control the first rectifier circuit 203 shown in FIG. 7 to operate in the half-bridge mode. The first rectifier control signal may be preconfigured in the first controller 205, and is to enable the first rectifier circuit 203 to operate in the half-bridge mode. The preconfigured first rectifier control signal (Sa, Sb, Sb1, Sa1) output by the first controller 205 may be shown in FIG. 10a.

When the wireless charging receive apparatus 20 is just started, a current received by the first rectifier circuit 203 is relatively small. In this case, the first rectifier circuit 203 is in a half-bridge diode rectification phase P1 shown in FIG. 10a. A signal received by a control end of a first switch transistor Sa is a high level, and the first switch transistor Sa is in a conducting state. Signals received by control ends of other switch transistors are low levels, and therefore the other switch transistors are in a cut-off state (the switch transistors are in a disconnected state). As shown in FIG. 10b, in the half-bridge diode rectification phase P1, a voltage Vin provided by the transmit coil 311 gradually increases from 0 V. In this case, the power supply voltage Vrect output by the first rectifier circuit 203 also gradually increases from 0 V.

Figure 10A:
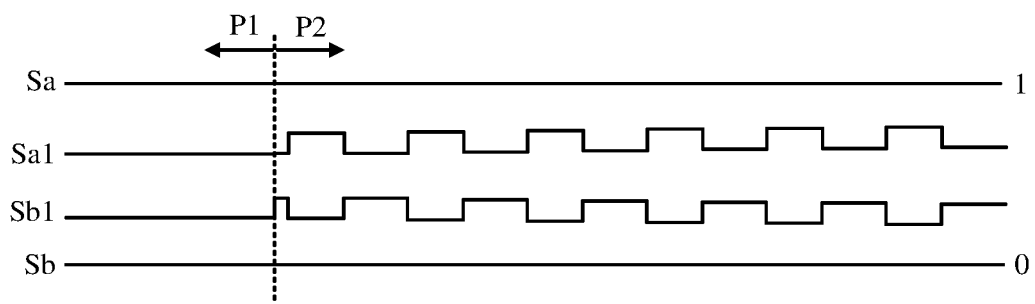
FIG. 10a is a sequence diagram of a control signal of a first rectifier circuit in FIG. 7.
Figure 10B:
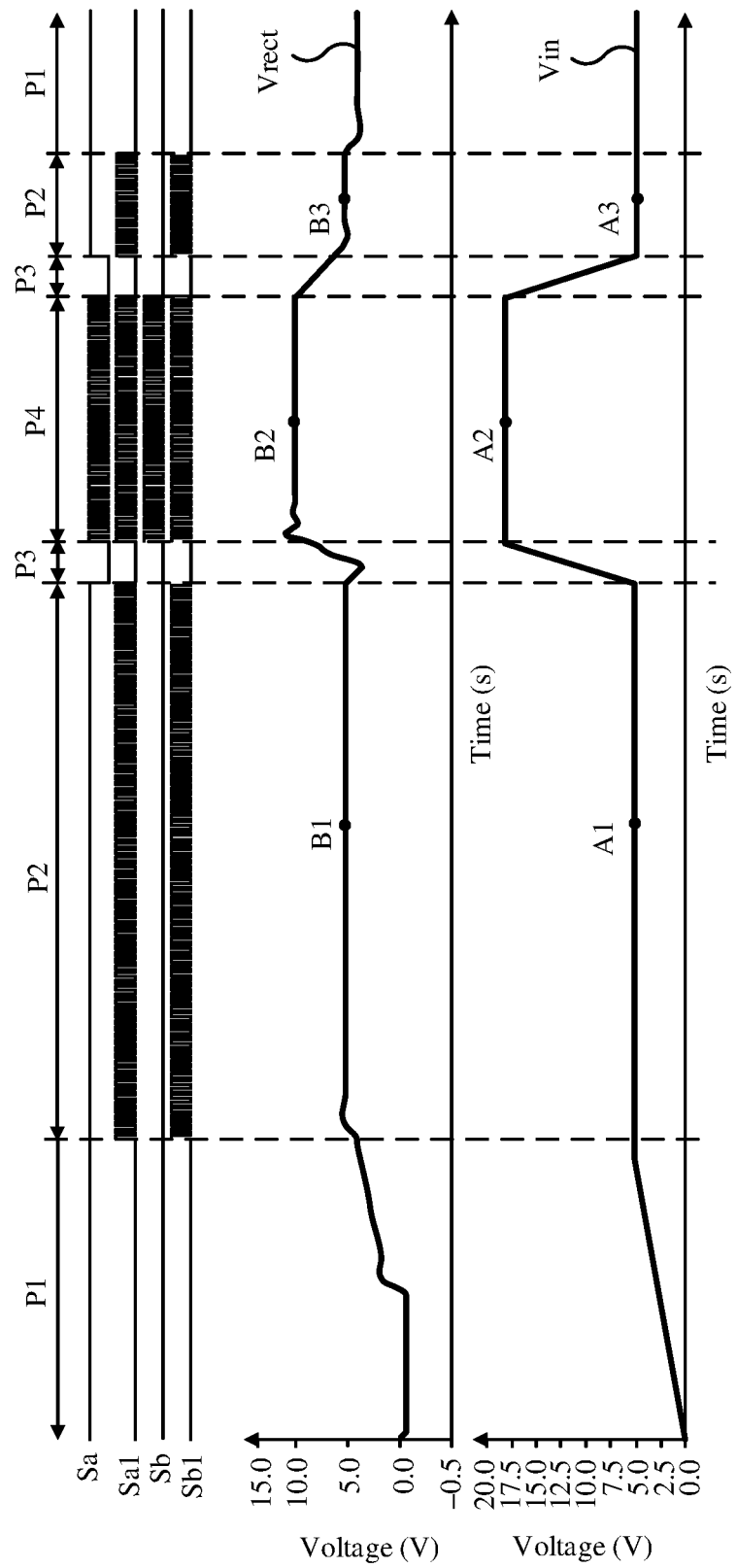
FIG. 10b is a sequence diagram of another control signal of a first rectifier circuit in FIG. 7.

As the current received by the first rectifier circuit 203 gradually increases, the first rectifier circuit 203 is in a half-bridge synchronous rectification phase P2 shown in FIG. 10a. In this case, the signal received by the control end of the first switch transistor Sa is the high level (represented by "1"). Signals received by control ends of a third switch transistor Sb1 and a fourth switch transistor Sa1 alternate to the high level, so that the first switch transistor Sa may keep in the conducting state, and the third switch transistor Sb1 and the fourth switch transistor Sa1 may be alternately conducted. In addition, a signal received by a control end of a second switch transistor Sb is the low level (represented by "0"), and the second switch transistor Sb is always in the cut-off state.

Figure 11A:
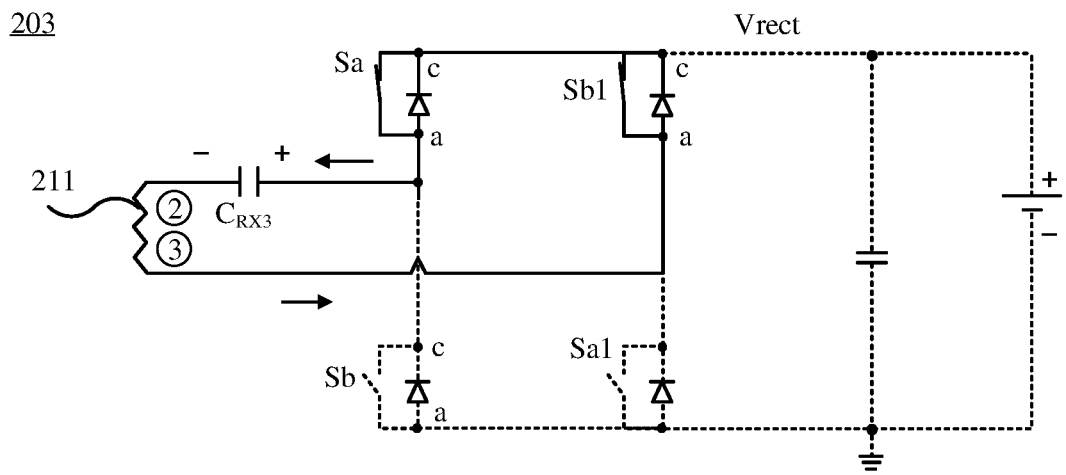
FIG. 11a is a schematic diagram of an operating mode of a first rectifier circuit in FIG. 7.

Specifically, when a polarity (a positive electrode is represented by +, and a negative electrode is represented by −) of a first induced voltage output by the first receive coil 211 based on an alternating magnetic field generated by the transmit coil 311 is shown in FIG. 11a, in the first rectifier circuit 203 in the half-bridge mode, when the signals received by the control ends of the first switch transistor Sa and the third switch transistor Sb1 are high levels, the first switch transistor Sa and the third switch transistor Sb1 are conducted, and other switch transistors such as the second switch transistor Sb and the fourth switch transistor Sa1 are in the cut-off state (represented by dashed lines in FIG. 11a). A current on the first rectifier circuit 203 charges a third resonant capacitor $C_{RX3}$ to 0.5 times the power supply voltage Vrect. The third resonant capacitor $C_{RX3}$ has a direct current bias of a 0.5 Vrect voltage.

Figure 11B:
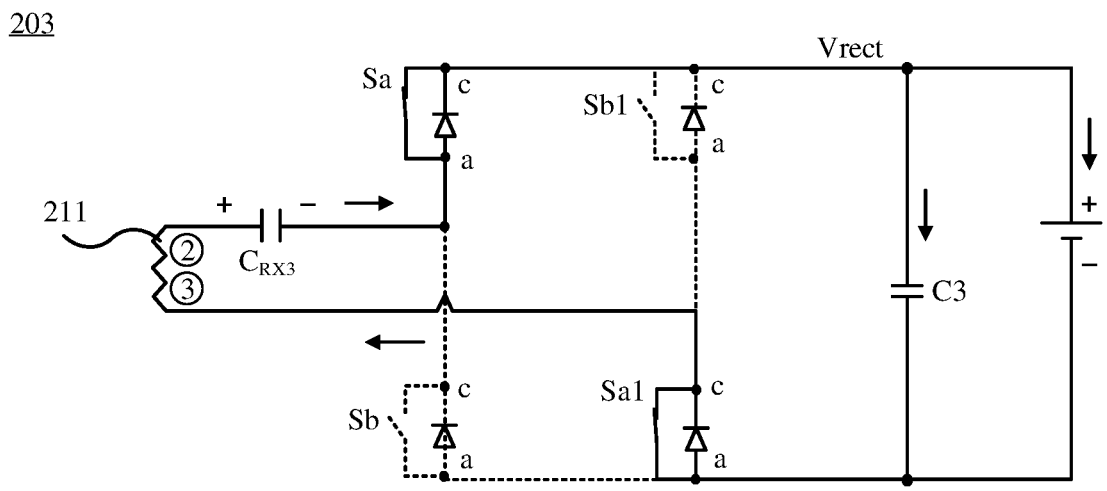
FIG. 11b is a schematic diagram of another operating mode of a first rectifier circuit in FIG. 7.

Next, when a direction of the alternating magnetic field generated by the transmit coil 311 changes, a polarity (a positive electrode is represented by +, and a negative electrode is represented by −) of the first induced voltage output by the first receive coil 211 based on the alternating magnetic field whose direction changes is shown in FIG. 11b, which is opposite to the polarity of the induced voltage in FIG. 11a. In this case, in the first rectifier circuit 203 in the half-bridge mode, when the signals received by the control ends of the first switch transistor Sa and the fourth switch transistor Sa1 are the high levels, the first switch transistor Sa and the fourth switch transistor Sa1 are conducted. Other switch transistors such as the second switch transistor Sb and the third switch transistor Sb1 are cut off (represented by dashed lines in FIG. 11b).

The third resonant capacitor $C_{RX3}$ (which has 0.5 times the power supply voltage Vrect) is connected in series to the first receive coil 211 (which has 0.5 times the power supply voltage Vrect). Therefore, a voltage on the third resonant capacitor $C_{RX3}$ and a voltage on the first receive coil 211 may be superimposed on an output filter capacitor C3 (as shown in FIG. 7, disposed at both ends of the battery 50) and the battery 50. In this case, the power supply voltage Vrect output by the first rectifier circuit 203 is multiplied, so that the power supply voltage Vrect output by the first rectifier circuit 203 is greater than a voltage input to the first rectifier circuit 203.

Figure 10C:
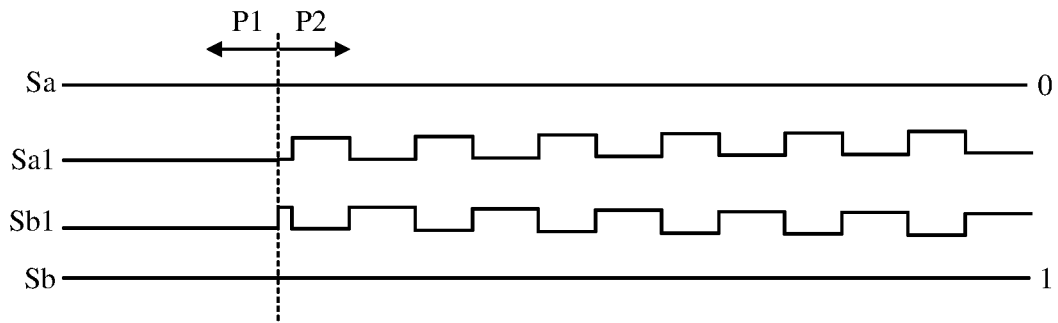
FIG. 10c is a sequence diagram of another control signal of a first rectifier circuit in FIG. 7.

It should be noted that, the foregoing uses an example in which the signal received by the control end of the first switch transistor Sa is the high level (represented by "1") and the signal received by the control end of the second switch transistor Sb is the low level (represented by "0"), as shown in FIG. 10a, to describe a case that the first rectifier circuit 203 operates in the half-bridge synchronous rectification phase P2. In some other embodiments of this application, as shown in FIG. 10c, the signal received by the control end of the first switch transistor Sa may be the low level (represented by "0"), and the first switch transistor Sa is always in the cut-off state. The signal received by the control end of the second switch transistor Sb may be the high level (represented by "1"), and the second switch transistor Sb is always in the conducting state. In this case, a process in which the first rectifier circuit 203 operates in the half-bridge synchronous rectification phase P2 shown in FIG. 10b may be obtained similarly. Details are not described herein again.

In this case, the first rectifier circuit 203 operates in the half-bridge synchronous rectification phase P2, and an input-to-output voltage ratio of the first rectifier circuit 203 may be or approximate to 1:2. When load of the first rectifier circuit 203 is smaller, the input-to-output voltage ratio of the first rectifier circuit 203 operating in the half-bridge synchronous rectification phase P2 is closer to 1:2. When the load of the first rectifier circuit 203 is larger, the output voltage of the first rectifier circuit 203 operating in the half-bridge synchronous rectification phase P2 is slightly less than twice the input voltage. For ease of description, an example in which the input-to-output voltage ratio of the first rectifier circuit 203 is 1:2 when the first rectifier circuit 203 operating in the half-bridge mode operates in the half-bridge synchronous rectification phase P2 is used for description in the following.

Based on this, when the wireless charging system uses the first charging type, the voltage Vin provided by the transmit coil 311 is, for example, 5 V (a voltage at a point A1 in FIG. 10b). The gain of the voltage converter including the transmit coil 311 and the first receive coil 211 may be 2:1. Therefore, the voltage output by the first receive coil 211 is 2.5 V.

In this case, in the half-bridge synchronous rectification phase P2 shown in FIG. 10b, the power supply voltage Vrect output by the first rectifier circuit 203 is about 5 V (a voltage at a point B1 in FIG. 10b). In this way, a ratio of the voltage Vin provided by the transmit coil 311 to the power supply voltage Vrect (that is, an input voltage of the voltage conversion circuit 206) output by the first rectifier circuit 203 is 1:1. The voltage conversion circuit 206 may convert the power supply voltage Vrect (5 V), and supply power to the battery 50 by using a converted voltage (for example, 3.7 V).

It should be noted that the wireless charging receive apparatus 20 provided in this embodiment of this application may further include a switch transistor Sc shown in FIG. 7. The switch transistor Sc is coupled between the first rectifier circuit 203 and the voltage conversion circuit 206, and a control end of the switch transistor Sc may be coupled to the first controller 205. In this way, the first controller 205 coupled to an output end of the first rectifier circuit 203 may collect the voltage output by the first rectifier circuit 203. When the electronic device 01 just starts to be charged, the voltage output by the first rectifier circuit 203 is not stable enough. In this case, the first controller 205 may determine that the voltage output by the first rectifier circuit 203 cannot meet a charging requirement of the battery 50. The first controller 205 may control the control end of the switch transistor Sc, to disconnect the switch transistor Sc, so as to avoid impact on performance of the battery 50 because the battery 50 is charged by the unstable voltage that is output by the first rectifier circuit 203 after the unstable voltage is converted by the voltage conversion circuit 206.

In addition, after the first rectifier circuit 203 outputs a stable power supply voltage Vrect, the first controller 205 may control the control end of the switch transistor Sc, so that the switch transistor Sc is in the conducting state. Therefore, the power supply voltage Vrect output by the first rectifier circuit 203 can be transmitted to the voltage conversion circuit 206 through the control switch transistor Sc.

The wireless charging system provided in this embodiment of this application may further support a second charging type, for example, high-power charging applicable to fast charging, and a voltage provided by the transmit coil 311 is, for example, 20 V. In this case, the following step S104 is performed before high-power charging is performed.

S104: The second communication circuit 301 establishes communication with the first communication circuit 201.

In this case, a communication connection may be established between the second communication circuit 301 and the first communication circuit 201. The second communication circuit 301 may send the foregoing charging protocol to the first communication circuit 201. The first communication circuit 201 transmits the received charging protocol to the first controller 205.

S105: Determine whether a communication handshake between the second communication circuit 301 and the first communication circuit 201 succeeds.

Specifically, the first controller 205 identifies the charging protocol, and performs step S103 when identifying that the charging type is the first charging type. When identifying that the charging type is the second charging type, the first controller 205 performs the following step S106.

S106: A second controller generates a first voltage adjustment control signal.

After the first controller 205 identifies that the charging type is the second charging type, the first controller 205 may send a first voltage adjustment instruction to the first communication circuit 201. The first voltage adjustment instruction is used to instruct to increase the voltage provided by the transmit coil 311. The second communication circuit 301 (as shown in FIG. 2a) can receive the first voltage adjustment instruction and send the first voltage adjustment instruction to the second controller 304. The second controller 304 generates the first voltage adjustment control signal based on the first voltage adjustment instruction, so that the voltage provided by the transmit coil 311 can be increased from previous 5 V to 20 V.

S107: The first rectifier circuit 203 operates in a full-bridge mode.

It can be learned from the foregoing description that the gain of the voltage converter including the transmit coil 311 and the first receive coil 211 may be 2:1. Therefore, the voltage output by the first receive coil 211 may be 5 V. In this case, when the first controller 205 identifies that the charging type is the second charging type, the first controller 205 inputs a second rectifier control signal to the first rectifier circuit 203 shown in FIG. 7, and controls the first rectifier circuit 203 to operate in the full-bridge mode.

It should be noted that, when the first rectifier circuit 203 just switches from the half-bridge mode to the full-bridge mode, the first rectifier circuit 203 first enters a full-bridge diode rectification phase P3 shown in FIG. 10b. In the full-bridge diode rectification phase P3, the signals received by the control ends of all the switch transistors (Sa, Sb, Sb1, Sa1) in the first rectifier circuit 203 are all the low levels (0). Therefore, all the switch transistors are in the cut-off state.

In this case, to implement high-power charging, in the full-bridge diode rectification phase P3, the voltage Vin provided by the transmit coil 311 gradually increases from 5 V to about 20 V. For example, a voltage at a point A2 in FIG. 10b is 18 V. For ease of description, for example, the voltage Vin provided by the transmit coil 311 is 20 V. In addition, because all switch transistors in the first rectifier circuit 203 are in the cut-off state, the power supply voltage Vrect output by the first rectifier circuit 203 decreases in the full-bridge diode rectification phase P3.

Figure 12:
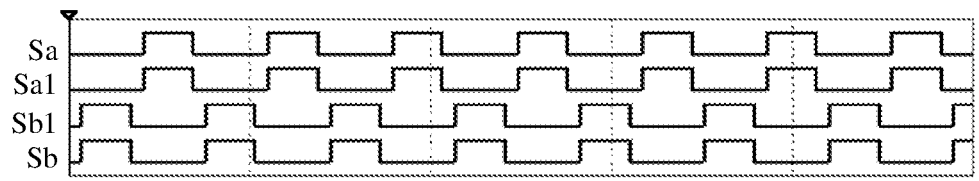
FIG. 12 is a sequence diagram of another control signal of a first rectifier circuit in FIG. 7.

After the first rectifier circuit 203 totally enters the full-bridge mode, the first 10b. The second rectifier control signal (Sa, Sb, Sb1, Sa1) output by the first controller 205 may be shown in FIG. 12. The signals received by the control ends of the first switch transistor Sa and the fourth switch transistor Sa1 are the same, and the signals received by the control ends of the second switch transistor Sb and the third switch transistor Sb1 are the same. The signal received by the control end of the first switch transistor Sa is opposite to the signal received by the control end of the second switch transistor Sb.

Figure 13A:
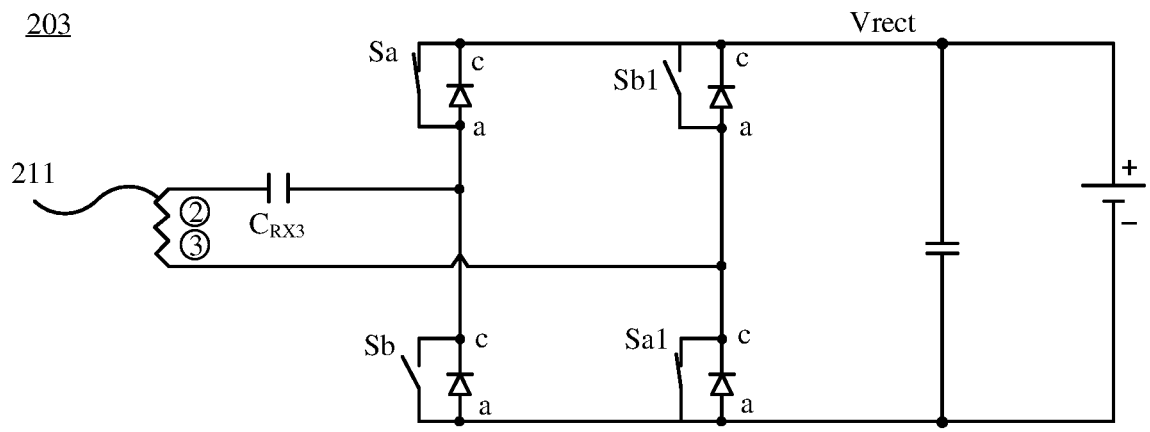
FIG. 13a is a schematic diagram of another operating mode of a first rectifier circuit in FIG. 7.
Figure 13B:
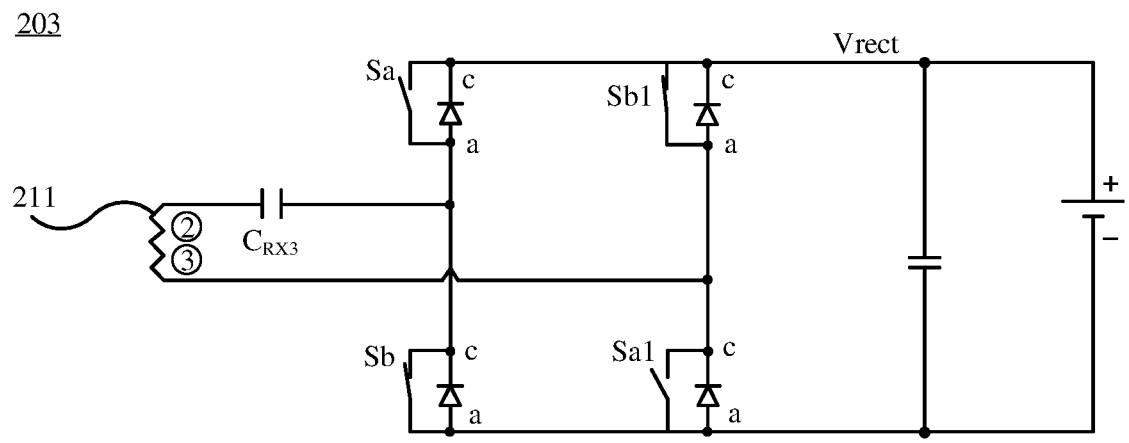
FIG. 13b is a schematic diagram of another operating mode of a first rectifier circuit in FIG. 7.

In this case, as shown in FIG. 13a, the first switch transistor Sa and the fourth switch transistor Sa1 are a first gating group, and the second switch transistor Sb and the third switch transistor Sb1 are a second gating group. The first gating group and the second gating group in the first rectifier circuit 203 in the full-bridge mode are alternately conducted. For example, in FIG. 13a, the first gating group (the first switch transistor Sa and the fourth switch transistor Sa1) is conducted, and the second gating group (the second switch transistor Sb and the third switch transistor Sb1) is cut off. In FIG. 13b, the first gating group (the first switch transistor Sa and the fourth switch transistor Sa1) is cut off, and the second gating group (the second switch transistor Sb and the third switch transistor Sb1) is conducted. It can be learned from an operating principle of the full-bridge second rectifier circuit 214 that, when the first rectifier circuit 203 operates in the full-bridge mode, the input-to-output voltage ratio of the first rectifier circuit 203 is 1:1.

S108: Perform high-power charging on the electronic device 01.

When high-power charging is performed on the electronic device 01, it can be learned from the foregoing description that the wireless charging system uses the second charging type, the voltage Vin provided by the transmit coil 311 is, for example, 20 V, and the gain of the voltage converter including the transmit coil 311 and the first receive coil 211 may be 2:1. Therefore, the voltage output by the first receive coil 211 is 10 V, and the power supply voltage Vrect output by the first rectifier circuit 203 is about 10 V (a voltage at a point B2 in FIG. 10b). In this way, the ratio of the voltage Vin provided by the transmit coil 311 to the power supply voltage Vrect (that is, the input voltage of the voltage conversion circuit 206) output by the first rectifier circuit 203 is 2:1. The voltage conversion circuit 206 may convert the power supply voltage Vrect (10 V), and charge the battery 50 by using a converted voltage (for example, 3.7 V). After the voltage conversion circuit 206 bucks the voltage, because the charging power is high power, a current flowing into the battery 50 in a unit time increases, so that fast charging can be implemented.

In conclusion, in one aspect, it can be learned from the foregoing description that the inductance of the first receive coil 211 may be 1/n of the inductance of the transmit coil 311. For example, when the inductance of the first receive coil 211 may be ¼ of the inductance of the transmit coil 311, the gain of the voltage converter including the transmit coil 311 and the first receive coil 211 is 2:1, and the voltage output by the first receive coil 211 to the first rectifier circuit 203 is half of the input voltage of the transmit coil 311.

Therefore, regardless of whether the wireless charging system charges the electronic device 01 by using the first charging type (low power) or the second charging type (high power), the first induced voltage output by the first receive coil 211 to the first rectifier circuit 203 can be reduced. Therefore, a probability that over voltage protection (over voltage protection, OVP) occurs on the wireless charging receive apparatus 20 can be reduced.

In addition, because the voltage received by the first rectifier circuit 203 is reduced, a withstand voltage of the first rectifier circuit 203 may be reduced. In this case, the first switch transistor Sa, the second switch transistor Sb, the third switch transistor Sb1, and the fourth switch transistor Sa1 in the first rectifier circuit 203 may be made of a metal oxide semiconductor (metal oxide semiconductor, MOS) field-effect transistor prepared by using a low-voltage process, to reduce production costs.

In a second aspect, when the wireless charging system charges the battery 50 by using the second charging type (high power), the voltage converter including the transmit coil 311 and the first receive coil 211 can reduce the first induced voltage output by the first receive coil 211. Therefore, only one level of voltage conversion circuit 206 (for example, an SC circuit with a buck ratio of 2:1) may be disposed in the wireless charging receive apparatus 20. In this way, a quantity of cascaded voltage conversion circuits 206 in the wireless charging receive apparatus 20 can be reduced, thereby reducing a problem of a relatively large power transmission efficiency loss caused by an excessively large quantity of cascaded voltage conversion circuits 206.

The following describes impact of cascading of the voltage conversion circuits 206 on output power of the wireless charging receive apparatus 20.

First, efficiency of the voltage converter including the transmit coil 311 and the first receive coil 211 is set to be constant. Output power of the voltage converter whose gain is 2:1 is the same as output power of the voltage converter whose gain is 1:1(W=UI). In this case, as shown in Table 1, coil losses of the first receive coils 211 in the foregoing two converters are the same. Table 1 shows specific values of inductance values, resistance values, output voltages, coil currents, and coil losses of the first receive coil 211 in the foregoing two voltage converters.

TABLE 1

| Converter gain | Inductance value | Resistance value | Output voltage | Coil current | Coil loss |
| --- | --- | --- | --- | --- | --- |
| 1:1 | L | R | U | I | $I^2R$ |
| 2:1 | (1/4) L | (1/4) L | U $\sqrt{(1/4)}$ | I/$\sqrt{(1/4)}$ | $I^2R$ |

It can be learned from Table 1 that when the gain of the voltage converter including the transmit coil 311 and the first receive coil 211 is 1:1, values of the inductance value, the resistance value, the coil voltage, and the coil current of the first receive coil 211 are the same as those of the transmit coil 311.

When the inductance value (L), the resistance value (R), the output voltage (U), and the coil current (I) of the transmit coil 311 remain unchanged, and when the gain of the voltage converter including the transmit coil 311 and the first receive coil 211 is 2:1, it can be learned from the foregoing description that the inductance value of the first receive coil 211 is (¼) L.

It can be learned from the foregoing formula (1) that the output voltage of the first receive coil 211 is $U\sqrt{(1/4)}$. When the output power of the voltage converter remains unchanged, because the power W=UI, the coil current of the first receive coil 211 is $I/\sqrt{(1/4)}$. In this way, according to the Joule's law, a coil loss Q of the first receive coil 211 is $I^2R$. Therefore, when the output power of the voltage converter whose gain is 1:1 is the same as the output power of the voltage converter whose gain is 2:1, coil losses of the first receive coils 211 in the foregoing two converters are the same. For example, output efficiency of the transmit coil 311 is 15 W, and efficiency of the voltage converter that includes the transmit coil 311 and the first receive coil 211 and whose gain is 1:1 and efficiency of the voltage converter that includes the transmit coil 311 and the first receive coil 211 and whose gain is 2:1 both may be 97%.

In addition, for example, conversion efficiency of the first rectifier circuit 203 may be 98%, and conversion efficiency of one level of SC circuit with a buck ratio of 2:1 is 97%. Total efficiency of the charging receive apparatus 20 is 97%×98%×97%=92.2%. The output power of the wireless charging receive apparatus 20 is 15 W×92.3%=13.83 W.

Therefore, when efficiency of the voltage converter including the transmit coil 311 and the first receive coil 211 and efficiency of the first rectifier circuit 203 remain unchanged, a smaller quantity of cascaded circuits indicates higher output power of the wireless charging receive apparatus 20. In addition, when the efficiency of the voltage converter including the transmit coil 311 and the first receive coil 211 and the efficiency of the first rectifier circuit 203 remain unchanged, and the quantity of cascaded voltage conversion circuits 206 remains unchanged, higher efficiency of the voltage conversion circuit 206 indicates higher output power of the wireless charging receive apparatus 20.

For example, when the voltage conversion circuit 206 is a buck voltage with conversion efficiency of 94.1%, similarly, it may be learned that the total efficiency of the charging receive apparatus 20 is 97%×98%×97%=89.5%. The output power of the wireless charging receive apparatus 20 is 15 W×89.5%=13.43 W. Therefore, when the voltage conversion circuit 206 is the SC circuit with the conversion efficiency of 97% and the buck ratio of 2:1, the output power of the wireless charging receive apparatus 20 can be increased by (13.83 W−13.43 W)/13.83 W=3%.

In addition, because only one level of voltage conversion circuit 206 is disposed in the wireless charging receive apparatus 20, a size of the wireless charging receive apparatus 20 can be reduced, thereby helping reduce component space of the wireless charging receive apparatus 20 in the electronic device 01.

In a third aspect, it can be learned from FIG. 7 that, when the wireless charging receive apparatus 20 starts to perform the charging process, the first rectifier circuit 203 in the wireless charging receive apparatus 20 operates in the half-bridge mode. In this case, the electronic device performs charging of the first charging type (low power). After the communication connection is established between the second communication circuit 301 and the first communication circuit 201, and the high-power charging protocol sent by the second communication circuit 301 is identified by the first controller 205 to implement the communication handshake, the first rectifier circuit 203 may operate in the full-bridge mode. In this case, the wireless charging system charges the electronic device 01 by using the second charging type (high power). In addition, if the communication handshake fails, in other words, when the charging protocol sent by the second communication circuit 301 cannot be identified by the first controller 205 as the high-power charging protocol, the wireless charging system continues to charge the electronic device 01 by using the first charging type (low power). Therefore, the wireless charging system may be compatible with both the first charging type (low power) and the second charging type (high power).

In addition, when the electronic device 01 performs high-power charging, the electronic device 01 may further switch to low-power charging based on a requirement. For example, when the battery 50 generates relatively large heat in a high-power charging process of the electronic device 01, high-power charging may be switched to low-power charging. Alternatively, when the battery 50 is fully charged or is about to be fully charged, to reduce an energy loss or adverse impact on the battery 50, high-power charging may be switched to low-power charging. Alternatively, a charging mode selection icon of a charging mode may be set on a display interface of the electronic device 01, for example, a mobile phone, and a user controls the charging mode selection icon based on a requirement, to switch from high-power charging to low-power charging.

In this case, the first controller 205 may send the second voltage adjustment instruction to the first communication circuit 201. The second voltage adjustment instruction is used to instruct to decrease the input voltage of the first receive coil 211. It can be learned from the foregoing description that, in some embodiments of this application, as shown in FIG. 2a, the second communication circuit 301 in the wireless charging transmit apparatus 30 may transmit the second voltage adjustment instruction to the second controller 304. After receiving the second voltage adjustment instruction output by the second communication circuit 301, the second controller 304 generates the second voltage adjustment control signal. The second voltage adjustment control signal is used to decrease the output voltage of the adapter 40. In this case, the voltage provided by the transmit coil 311 is also decreased, for example, decreased to 5 V. It can be learned from the foregoing description that the gain of the voltage converter including the transmit coil 311 and the first receive coil 211 may be 2:1. Therefore, the voltage output by the first receive coil 211 may be 2.5 V. In this way, the input voltage of the first receive coil 211 is decreased.

Alternatively, as shown in FIG. 2d, when the wireless charging transmit apparatus 30 further includes the voltage adjustment circuit 305 coupled to the DC/AC 302 and the adapter 40, the second controller 304 generates the second voltage adjustment control signal after receiving the second voltage adjustment instruction output by the second communication circuit 301. The second voltage adjustment control signal is used to decrease the output voltage of the voltage adjustment circuit 305, so as to decrease the input voltage of the first receive coil 211.

In addition, the first controller 205 further outputs the first rectifier control signal to the first rectifier circuit 203, to control the first rectifier circuit 203 to operate in the half-bridge synchronous rectification phase P2 (the second P2 phase) shown in FIG. 10b. When the first rectifier circuit 203 operates in the half-bridge synchronous rectification phase P2, a process in which the electronic device 01 performs low-power charging is the same as that described above. Details are not described herein again.

It should be noted that, when the first rectifier circuit 203 just switches from the full-bridge mode to the half-bridge mode, the first rectifier circuit 203 needs to pass through the full-bridge diode rectification phase P3 shown in FIG. 10b. When the first rectifier circuit 203 is in the full-bridge diode rectification phase P3, the voltage Vin provided by the transmit coil 311 decreases to about 5 V (for example, a voltage at a node A3 in FIG. 10b). In this case, the power supply voltage Vrect output by the first rectifier circuit 203 also decreases to about 5 V (for example, a voltage at a node B3 in FIG. 10b). An operating process of the first rectifier circuit 203 in the full-bridge diode rectification phase P3 is the same as that described above. Details are not described herein again.

In addition, after the battery 50 in the electronic device 01 is fully charged, if the electronic device 01 is still placed on the cradle 02, to reduce heating of the electronic device, as shown in FIG. 10b, the first rectifier circuit 203 enters the half-bridge diode rectification phase P1 (the second P1 phase). In this case, although the voltage Vin provided by the transmit coil 311 is still 5 V, the power supply voltage Vrect output by the first rectifier circuit 203 decreases, which reduces heating of the electronic device.

Certainly, the foregoing describes switching of the electronic device 01 from high-power charging to low-power charging. The electronic device 01 may further switch from low-power charging to high-power charging based on a requirement, for example, by controlling the charging mode selection icon by the user. In this case, the first controller 205 may send the first voltage adjustment instruction to the first communication circuit 201, and the first controller 205 further outputs the second rectifier control signal to the first rectifier circuit 203, to control the first rectifier circuit 203 to operate in the full-bridge mode. A process in which the input voltage of the first receive coil 211 is increased by using the first voltage adjustment instruction and the first rectifier circuit 203 operates in the full-bridge mode is not described herein again.

In conclusion, when the wireless charging receive apparatus 20 is just started, the first rectifier circuit 203 first enters the half-bridge diode rectification phase P1, and then enters the half-bridge synchronous rectification phase P2, so that the electronic device 01 performs low-power charging. After the communication handshake between the second communication circuit 301 and the first communication circuit 201 succeeds, in other words, when the first controller 205 identifies that the charging type is the second charging type, the first rectifier circuit 203 switches from the half-bridge mode to the full-bridge mode, so that the electronic device 01 performs high-power charging. Then, the electronic device 01 may switch between high-power charging and low-power charging based on a requirement. In this case, the first rectifier circuit 203 also switches between the full-bridge mode and the half-bridge mode accordingly. When the first rectifier circuit 203 just switches from the full-bridge mode to the half-bridge mode, or when the first rectifier circuit 203 just switches from the half-bridge mode to the full-bridge mode, the first rectifier circuit 203 needs to pass through the full-bridge diode rectification phase P3 shown in FIG. 10b. In addition, after the electronic device 01 is charged, the first rectifier circuit 203 enters the half-bridge diode rectification phase P1, so that the power supply voltage Vrect output by the first rectifier circuit 203 is reduced, thereby reducing heating of the electronic device.

EXAMPLE 2

Figure 14:
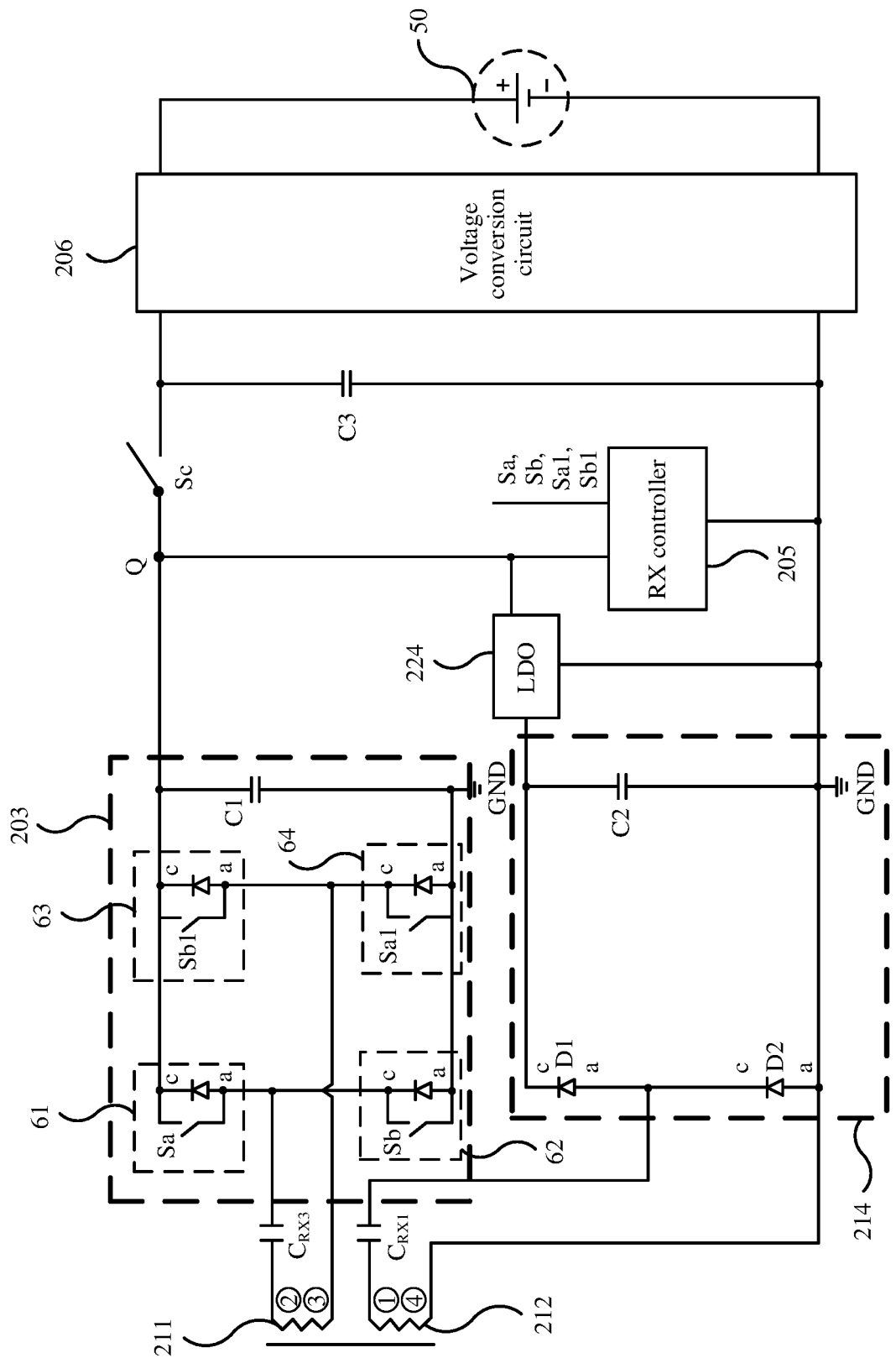
FIG. 14 is a schematic diagram of another structure of a wireless charging receive apparatus according to an embodiment of this application.

In this example, a structure of the wireless charging receive apparatus 20 is shown in FIG. 14. A difference from Example 1 in a structure of the second rectifier circuit 214 in the startup circuit 204 (FIG. 4). A disposing manner and a control method of another component in the charging receive apparatus 20 are the same as those described above. Details are not described herein again.

For example, the second rectifier circuit 214 includes a first diode D1, a second diode D2, and a second filter capacitor C2 that are connected in series. A cathode c of the first diode D1 serves as an output end of the second rectifier circuit 214, and is coupled to the second voltage regulator circuit 224, so that the output end of the second rectifier circuit 214 is coupled to the first controller 205 through the second voltage regulator circuit 224. A first end of the second filter capacitor C2 is coupled to the cathode c of first diode D1, and a second end of the second filter capacitor C2 is coupled to a ground terminal GND. Compared with the second rectifier circuit 214 shown in FIG. 7, a quantity of diodes in the second rectifier circuit 214 in this example is reduced, so that a quantity of electronic components in the second rectifier circuit 214 can be reduced, and a circuit structure can be simplified.

In addition, in the first oscillation circuit 202, a first end of a first resonant capacitor $C_{RX1}$ is coupled to a first end of the second receive coil 212, and a second end of the first resonant capacitor $C_{RX1}$ is coupled to an anode a of the first diode D1 and a cathode c of the second diode D2. In addition, both a second end of the second receive coil 212 and an anode a of the second diode D2 are coupled to the ground terminal GND.

In this case, the second rectifier circuit 214 is a half-bridge rectifier circuit, and operates only in a half-bridge mode. Based on this, with reference to the half-bridge mode of the first rectifier circuit 203, it can be learned that an input-to-output voltage ratio of the second rectifier circuit 214 in the half-bridge mode may be 1:2. In this way, an output voltage of the second rectifier circuit 214 is greater than an input voltage of the second rectifier circuit 214. Therefore, a value of a first voltage Vc output by the startup circuit 204 can be effectively increased, so that the first controller receiving the first voltage Vc can be in an operating state. Based on this, because the second rectifier circuit 214 can boost the output voltage, an inductance of the second receive coil 212 does not need to be increased to increase the voltage input to the second rectifier circuit 214. In this way, because the inductance of the second receive coil 212 does not need to be increased, a quantity of winding circles of a metal cable in the second receive coil 212 can be reduced, thereby reducing component space of the second receive coil 212 in the electronic device 01.

Alternatively, in some other embodiments of this application, the second voltage regulator circuit 224 may be replaced with a DC/DC converter having boost and buck functions. A technical effect of the DC/DC converter having boost and buck functions is the same as that described above. Details are not described herein again.

EXAMPLE 3

Figure 15:
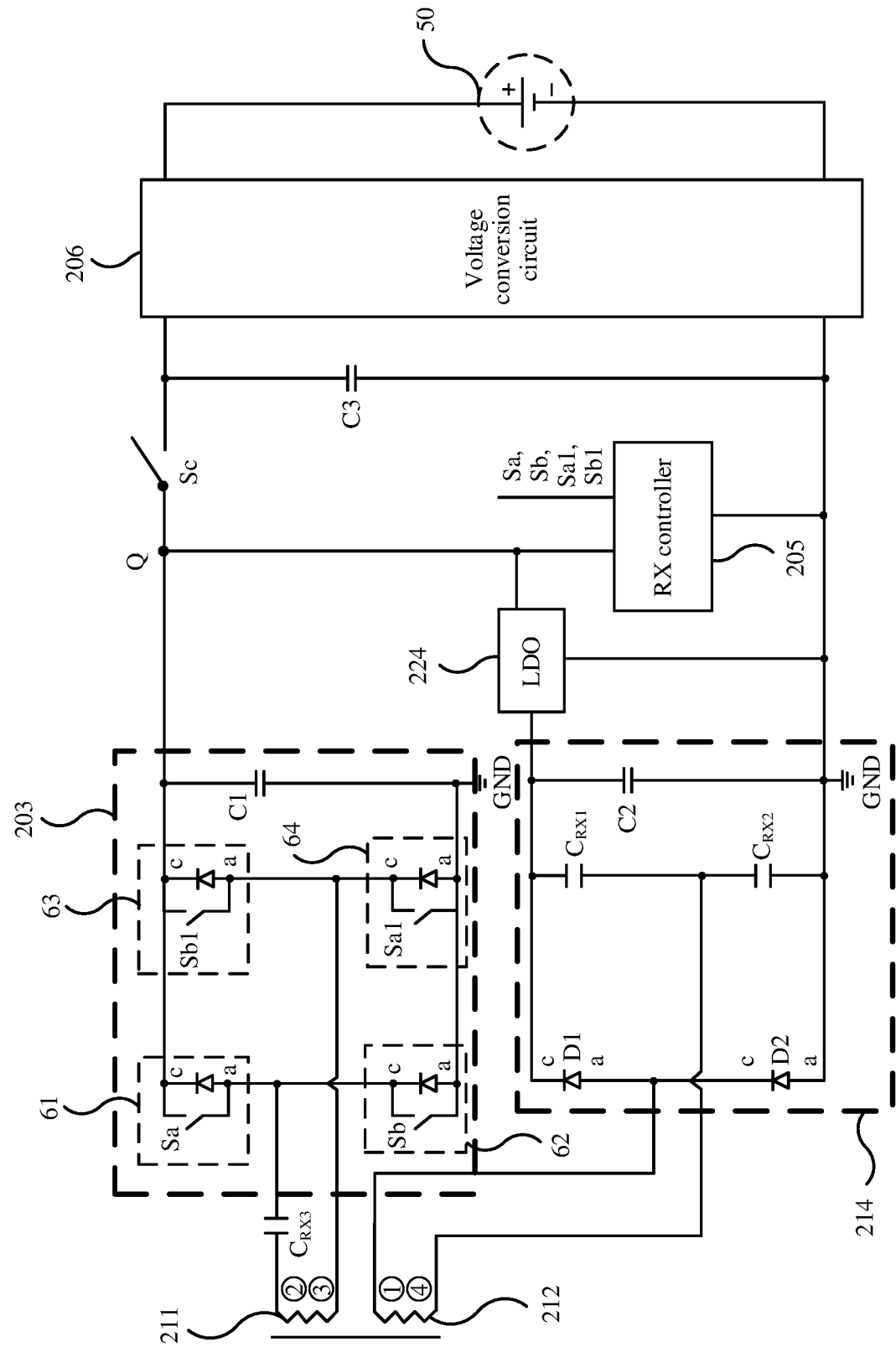
FIG. 15 is a schematic diagram of another structure of a wireless charging receive apparatus according to an embodiment of this application.

In this example, a structure of the wireless charging receive apparatus 20 is shown in FIG. 15. A difference from Example 1 in a structure of the second rectifier circuit 214 in the startup circuit 204 (FIG. 4). A disposing manner and a control method of another component in the charging receive apparatus 20 are the same as those described above. Details are not described herein again.

For example, the second rectifier circuit 214 includes a first diode D1, a second diode D2, and a second filter capacitor C2 that are connected in series. A cathode c of the first diode D1 serves as an output end of the second rectifier circuit 214, and is coupled to the second voltage regulator circuit 224, so that the output end of the second rectifier circuit 214 is coupled to the first controller 205 through the second voltage regulator circuit 224.

A first end of the second filter capacitor C2 is coupled to the cathode c of first diode D1, and a second end of the second filter capacitor C2 is coupled to a ground terminal GND. Compared with the second rectifier circuit 214 shown in FIG. 7, a quantity of diodes in the second rectifier circuit 214 in this example is reduced, so that a quantity of electronic components in the second rectifier circuit 214 can be reduced, and a circuit structure can be simplified. In addition, as described above, a quantity of turns of the second receive coil 212 may be reduced, to reduce component space.

In addition, the first oscillation circuit 202 further includes a first resonant capacitor $C_{RX1}$ and a second resonant capacitor $C_{RX2}$ that are connected in series. The cathode c of the first diode D1 is coupled to a first end of the first resonant capacitor $C_{RX3}$. Both an anode a of the second diode D2 and a second end of the second resonant capacitor $C_{RX2}$ are coupled to the ground terminal GND. In addition, a first end of the second receive coil 212 is coupled to an anode a of the first diode D1 and a cathode c of the second diode D2, and a second end of the second receive coil 212 is coupled between a second end of the first resonant capacitor $C_{RX1}$ and a first end of the second resonant capacitor $C_{RX2}$.

In this case, the second rectifier circuit 214 is a half-bridge rectifier circuit, and can operate only in a half-bridge mode. An operating process and a technical effect of the second rectifier circuit 214 are the same as those described above. Details are not described herein again.

It should be noted that the structure of the second rectifier circuit 214 provided in embodiments of this application is not limited to the structures in Example 1, Example 2, and Example 3. Other disposing manners of the second rectifier circuit 214 are not described herein one by one, provided that an alternating current induced by the second receive coil 212 can be rectified to output a direct current, and the first voltage Vc used to drive the first controller 205 to be in the operating state is generated after the direct current passes through the second voltage regulator circuit 224.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising:
    a wireless charging receive apparatus;
    a battery; and
    a circuit board;
    wherein the wireless charging receive apparatus comprises a first communication circuit, a first controller, a first rectifier circuit, and a first receive coil, and the first communication circuit, the first controller, and the first rectifier circuit are disposed on the circuit board;
    wherein the first communication circuit is coupled to the first controller, and the first communication circuit is configured to receive charging data, wherein the charging data indicates a charging type;
    wherein the first controller is coupled to the first rectifier circuit, and the first controller is configured to control the first rectifier circuit according to the charging type by:
        identifying, based on the charging data, that the charging type is a first charging type, and based on identifying the first charging type, outputting a first rectifier control signal to control the first rectifier circuit to operate in a half-bridge mode; or
        identifying, based on the charging data, that the charging type is a second charging type, and based on identifying the second charging type, outputting a second rectifier control signal to control the first rectifier circuit to operate in a full-bridge mode;
    wherein the first receive coil is coupled to the first rectifier circuit, and is configured to receive an alternating magnetic field and output a first induced voltage; and
    wherein the first rectifier circuit is further coupled to the battery, and the first rectifier circuit is configured to convert the first induced voltage into a direct current power supply voltage, wherein the direct current power supply voltage is used to supply power to the battery.

2. The electronic device of claim 1, wherein the wireless charging receive apparatus further comprises a second receive coil and a startup circuit disposed on the circuit board, the second receive coil is configured to receive the alternating magnetic field and output a second induced voltage, and an inductance of the first receive coil is less than an inductance of the second receive coil;
    wherein the startup circuit is coupled to the second receive coil and the first controller, and the startup circuit is configured to:
        convert the second induced voltage into a direct current first voltage, wherein the direct current first voltage is greater than or equal to a minimum operating voltage of the first controller; and
        transmit the direct current first voltage to the first controller; and
    wherein the first controller is further configured to output the first rectifier control signal to the first rectifier circuit after receiving the direct current first voltage, to control the first rectifier circuit to operate in the half-bridge mode.

3. The electronic device of claim 2, wherein the first receive coil is disposed inside the second receive coil, and a first end of the first receive coil and a second end of the first receive coil are located between a first end of the second receive coil and a second end of the second receive coil.

4. The electronic device of claim 2, wherein the second receive coil is disposed inside the first receive coil, and a first end of the first receive coil and a second end of the first receive coil are located between a first end of the second receive coil and a second end of the second receive coil.

5. The electronic device of claim 2, wherein a first part of the second receive coil is disposed inside the first receive coil, a second part of the second receive coil is disposed outside the first receive coil, and a first end of the first receive coil and a second end of the first receive coil are located between a first end of the second receive coil and a second end of the second receive coil.

6. The electronic device of claim 2, wherein an inductance of the second receive coil is four times an inductance of the first receive coil.

7. The electronic device of claim 2, wherein the startup circuit comprises a second rectifier circuit;
wherein the second rectifier circuit comprises a first diode and a second diode that are connected in series, and a third diode and a fourth diode that are connected in series, wherein cathodes of the first diode and the third diode are coupled to the first controller, and anodes of the second diode and the fourth diode are coupled to a ground terminal;
wherein the wireless charging receive apparatus further comprises a first resonant capacitor, wherein a first end of the first resonant capacitor is coupled to a first end of the second receive coil, and a second end of the first resonant capacitor is coupled to an anode of the first diode and a cathode of the second diode; and
wherein a second end of the second receive coil is coupled to an anode of the third diode and a cathode of the fourth diode.

8. The electronic device of claim 7, wherein the startup circuit further comprises a second voltage regulator circuit;
wherein the second voltage regulator circuit is coupled to the second rectifier circuit and the first controller;
wherein the second voltage regulator circuit is configured to:
convert a voltage output by the second rectifier circuit into the direct current first voltage when the direct current power supply voltage is less than a preset regulation voltage of the second voltage regulator circuit; or
disconnect the second rectifier circuit from the first controller when the direct current power supply voltage is greater than the preset regulation voltage of the second voltage regulator circuit; and
wherein the first controller is coupled to an output end of the first rectifier circuit, and the direct current power supply voltage is further used to supply power to the first controller.

9. The electronic device of claim 7, wherein the startup circuit further comprises a second voltage regulator circuit, the second voltage regulator circuit is coupled to the second rectifier circuit and the first controller, and the second voltage regulator circuit is configured to convert a voltage output by the second rectifier circuit into the direct current first voltage.

10. The electronic device of claim 2, wherein the startup circuit comprises a second rectifier circuit;
wherein the second rectifier circuit comprises a first diode and a second diode that are connected in series, and a cathode of the first diode is coupled to the first controller;
wherein the wireless charging receive apparatus further comprises a first resonant capacitor, wherein a first end of the first resonant capacitor is coupled to a first end of the second receive coil, and a second end of the first resonant capacitor is coupled to an anode of the first diode and a cathode of the second diode; and
wherein both a second end of the second receive coil and an anode of the second diode are coupled to a ground terminal.

11. The electronic device of claim 2, wherein the startup circuit comprises a second rectifier circuit;
wherein the second rectifier circuit comprises a first diode and a second diode that are connected in series;
wherein the wireless charging receive apparatus further comprises a first resonant capacitor and a second resonant capacitor that are connected in series, wherein a cathode of the first diode and a first end of the first resonant capacitor are coupled to the first controller, and both an anode of the second diode and a second end of the second resonant capacitor are coupled to a ground terminal; and
wherein a first end of the second receive coil is coupled to an anode of the first diode and a cathode of the second diode, and a second end of the second receive coil is coupled between a second end of the first resonant capacitor and a first end of the second resonant capacitor.

12. The electronic device of claim 1, wherein the wireless charging receive apparatus further comprises a first voltage regulator circuit disposed on the circuit board;
wherein the first voltage regulator circuit is coupled to the battery and the first controller, and wherein:
the first voltage regulator circuit is configured to transmit a voltage of the battery to the first controller when the direct current power supply voltage is less than a preset regulation voltage of the first voltage regulator circuit; or
the first voltage regulator circuit is configured to disconnect the battery from the first controller when the direct current power supply voltage is greater than the preset regulation voltage of the first voltage regulator circuit; and
wherein the first controller is coupled to an output end of the first rectifier circuit, and the direct current power supply voltage is further used to supply power to the first controller to control the first rectifier circuit to operate in the half-bridge mode.

13. The electronic device of claim 1, wherein the wireless charging receive apparatus further comprises a voltage conversion circuit disposed on the circuit board, the voltage conversion circuit is coupled to the first rectifier circuit and the battery, and the voltage conversion circuit is configured to: convert the direct current power supply voltage, and supply power to the battery using a converted voltage.

14. A wireless charging system, comprising:
a wireless charging transmit apparatus; and
an electronic device, comprising:
a wireless charging receive apparatus;
a battery; and
a circuit board;
wherein the wireless charging receive apparatus comprises a first communication circuit, a first controller, a first rectifier circuit, and a first receive coil, and the first communication circuit, the first controller, and the first rectifier circuit are disposed on the circuit board;
wherein the first communication circuit is coupled to the first controller, and the first communication circuit is configured to receive charging data, wherein the charging data indicates a charging type;
wherein the first controller is coupled to the first rectifier circuit, and the first controller is configured to:
identify, based on the charging data, that the charging type is a first charging type or a second charging type, and output a voltage adjustment instruction to control an input voltage of the first receive coil; and
control the first rectifier circuit according to the charging type by:
identifying, based on the charging data, that the charging type is a first charging type, and based on identifying the first charging type, outputting a first rectifier control signal to control the first rectifier circuit to operate in a half-bridge mode; or
identifying, based on the charging data, that the charging type is a second charging type, and based on identifying the second charging type, outputting a second rectifier control signal to control the first rectifier circuit to operate in a full-bridge mode;
wherein the first receive coil is coupled to the first rectifier circuit, and is configured to receive an alternating magnetic field and output a first induced voltage;
wherein the first rectifier circuit is further coupled to the battery, and the first rectifier circuit is configured to convert the first induced voltage into a direct current power supply voltage, wherein the direct current power supply voltage is used to supply power to the battery; and
wherein the wireless charging transmit apparatus comprises a transmit coil, the transmit coil is configured to transmit the alternating magnetic field received by the first receive coil in the electronic device, and an inductance of the transmit coil is greater than an inductance of the first receive coil.

15. The wireless charging system of claim 14, wherein when the first controller in the electronic device identifies, based on the charging data, that the charging type is the second charging type, the voltage adjustment instruction instructs to increase an input voltage of the first receive coil;
wherein the wireless charging system further comprises an adapter coupled to the transmit coil;
wherein the wireless charging transmit apparatus further comprises a second communication circuit and a second controller;
wherein the second communication circuit is coupled to the first communication circuit, and the second communication circuit is configured to send the charging data and receive the voltage adjustment instruction sent by the first communication circuit; and
wherein the second controller is coupled to the adapter and the second communication circuit, the second controller is configured to generate a first voltage adjustment control signal according to the voltage adjustment instruction, and the first voltage adjustment control signal is used to increase an output voltage of the adapter.

16. The wireless charging system of claim 14, wherein when the first controller in the electronic device identifies, based on the charging data, that the charging type is the second charging type, the voltage adjustment instruction is instructs to increase an input voltage of the first receive coil;
wherein the wireless charging system further comprises an adapter coupled to the transmit coil;
wherein the wireless charging transmit apparatus further comprises a voltage adjustment circuit, a second communication circuit, and a second controller;
wherein the voltage adjustment circuit is coupled to the transmit coil and the adapter, and the voltage adjustment circuit is configured to adjust a voltage output by the adapter to the transmit coil;
wherein the second communication circuit is coupled to the first communication circuit, and the second communication circuit is configured to send the charging data and receive the voltage adjustment instruction; and
wherein the second controller is coupled to the voltage adjustment circuit and the second communication circuit, the second controller is configured to generate a first voltage adjustment control signal according to the voltage adjustment instruction, and the first voltage adjustment control signal is used to increase an output voltage of the voltage adjustment circuit.

17. A wireless charging receive apparatus, comprising:
a first communication circuit;
a first controller;
a first rectifier circuit; and
a first receive coil;
wherein the first communication circuit is coupled to the first controller, and the first communication circuit is configured to receive charging data, wherein the charging data indicates a charging type;
wherein the first controller is coupled to the first rectifier circuit, and the first controller is configured to control the first rectifier circuit according to the charging type by:
identifying, based on the charging data, that the charging type is a first charging type, and based on identifying the first charging type, outputting a first rectifier control signal to control the first rectifier circuit to operate in a half-bridge mode;
identifying, based on the charging data, that the charging type is a second charging type, and based on identifying the second charging type, outputting a second rectifier control signal to control the first rectifier circuit to operate in a full-bridge mode;
wherein the first receive coil is coupled to the first rectifier circuit, and is configured to receive an alternating magnetic field and output a first induced voltage; and
wherein the first rectifier circuit is configured to convert the first induced voltage into a direct current power supply voltage, wherein the direct current power supply voltage is used to supply power to a battery.

18. The wireless charging receive apparatus of claim 17, wherein the wireless charging receive apparatus further comprises a second receive coil and a startup circuit, the second receive coil is configured to receive the alternating magnetic field and output a second induced voltage, and an inductance of the first receive coil is less than an inductance of the second receive coil;
wherein the startup circuit is coupled to the second receive coil and the first controller, and the startup circuit is configured to: convert the second induced voltage into a direct current first voltage, and transmit the direct current first voltage to the first controller, wherein the direct current first voltage is greater than or equal to a minimum operating voltage of the first controller; and
wherein the first controller is further configured to output the first rectifier control signal to the first rectifier circuit after receiving the direct current first voltage.

19. The wireless charging receive apparatus of claim 17, wherein the wireless charging receive apparatus further comprises a first voltage regulator circuit;
wherein the first voltage regulator circuit is coupled to the battery and the first controller, and the first voltage regulator circuit is configured to:
transmit a voltage of the battery to the first controller when the direct current power supply voltage is less than a preset regulation voltage of the first voltage regulator circuit; or disconnect the battery from the first controller when the direct current power supply voltage is greater than the preset regulation voltage of the first voltage regulator circuit; and wherein the first controller is coupled to an output end of the first rectifier circuit, and the direct current power supply voltage is further used to supply power to the first controller.

20. The wireless charging receive apparatus of claim 17, wherein the wireless charging receive apparatus further comprises a voltage conversion circuit; and wherein the voltage conversion circuit is coupled to the first rectifier circuit and the battery, and the voltage conversion circuit is configured to:

convert the direct current power supply voltage; and supply power to the battery by using a converted voltage.

\* \* \* \* \*